United States Patent
Hanks et al.

(10) Patent No.: US 7,420,580 B2
(45) Date of Patent: Sep. 2, 2008

(54) LASER POWER CALIBRATION IN AN OPTICAL DISC DRIVE

(75) Inventors: D. Mitchel Hanks, Ft. Collins, CO (US); Kevin L. Colburn, Greeley, CO (US); Lawrence N. Taugher, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 10/977,532

(22) Filed: Oct. 29, 2004

(65) Prior Publication Data

US 2006/0092792 A1    May 4, 2006

(51) Int. Cl.
B41J 2/435    (2006.01)
G11B 11/00    (2006.01)

(52) U.S. Cl. .................................. 347/224; 369/13.27

(58) Field of Classification Search .............. 369/47.15, 369/47.53, 53.21, 13.26, 13.27, 53.26, 53.27; 347/224–225

See application file for complete search history.

(56) References Cited

U.S. PATENT DOCUMENTS

| | | | |
|---|---|---|---|
| 5,134,602 A | 7/1992 | Baca et al. | |
| 5,216,659 A | 6/1993 | Call et al. | |
| 5,631,887 A | 5/1997 | Hurst, Jr. | |
| 5,640,381 A | 6/1997 | Call et al. | |
| 5,978,335 A | 11/1999 | Clark et al. | |
| 6,246,660 B1 | 6/2001 | Yanagawa | |
| 6,940,790 B1 * | 9/2005 | Powelson et al. | 369/47.15 |
| 7,187,637 B2 * | 3/2007 | Pate et al. | 369/53.21 |
| 2001/0026531 A1 | 10/2001 | Onodera et al. | |
| 2002/0118614 A1 | 8/2002 | Watt | |
| 2002/0122359 A1 | 9/2002 | Yoshida | |
| 2002/0141313 A1 | 10/2002 | Chuang | |
| 2003/0099177 A1 | 5/2003 | Wang | |
| 2003/0108708 A1 | 6/2003 | Anderson et al. | |
| 2003/0161224 A1 | 8/2003 | Anderson | |
| 2003/0179679 A1 | 9/2003 | Morishima | |
| 2003/0193864 A1 | 10/2003 | Pate et al. | |
| 2004/0001409 A1 | 1/2004 | Morishima | |

(Continued)

FOREIGN PATENT DOCUMENTS

JP    2000-173096    6/2000

OTHER PUBLICATIONS

International Search Report for Application No. PCT/US2005/035272. Report issued Mar. 6, 2006.

*Primary Examiner*—Hai C Pham

(57) ABSTRACT

Various systems, methods, and programs embodied on a computer-readable medium are provided for calibrating a laser power in an optical disc drive. In one embodiment, a range of reflectivity of an optical disc in the optical disc drive is established. A calibration pattern of marked segments is written to the optical disc and the reflectivity of the marked segments is measured. An average reflectivity is generated for each one of a plurality of laser power settings within the range of reflectivity, thereby obtaining a curve that depicts the average reflectivity with respect to the laser power settings. The laser power setting at a knee of the curve is identified and a slope of the curve at a position on the curve where the average reflectivity decreases as the laser power settings increase is determined. The laser power setting is calculated that results in a predefined darkness based upon the laser power setting at the knee and based upon the slope.

20 Claims, 9 Drawing Sheets

U.S. PATENT DOCUMENTS

2004/0090896 A1 5/2004 Chuang
2004/0114472 A1 6/2004 Wang
2004/0125836 A1 7/2004 Lai et al.
2006/0092792 A1* 5/2006 Hanks et al. ............. 369/47.53

* cited by examiner

LASER POWER CALIBRATION IN AN OPTICAL DISC DRIVE

CROSS REFERENCE TO RELATED APPLICATIONS

This application is related to co-pending U.S. patent application entitled "Laser Power Calibration in an Optical Disc Drive" filed on even date herewith and assigned application Ser. No. 10/978,192.

BACKGROUND

Some optical disc drives may be employed to both read and write data to an optical disc, and to write a label to an optical disc. When optical disc drives are manufactured at a factory, a power of a laser included in the optical disc drive may be optimized for the best performance, for example, in writing labels to optical discs. However, when an optical disc drive is used over time, degradation in the ability to write labels to optical discs inevitably occurs. For example, dust and other particles may collect on lenses associated with the laser, thereby reducing the amount of the laser power that actually strikes the surface of the optical disc. Also, the laser itself may suffer degradation in performance over time, further reducing the laser power. As a consequence, the label writing capability of the optical disc drive may be significantly degraded over time.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
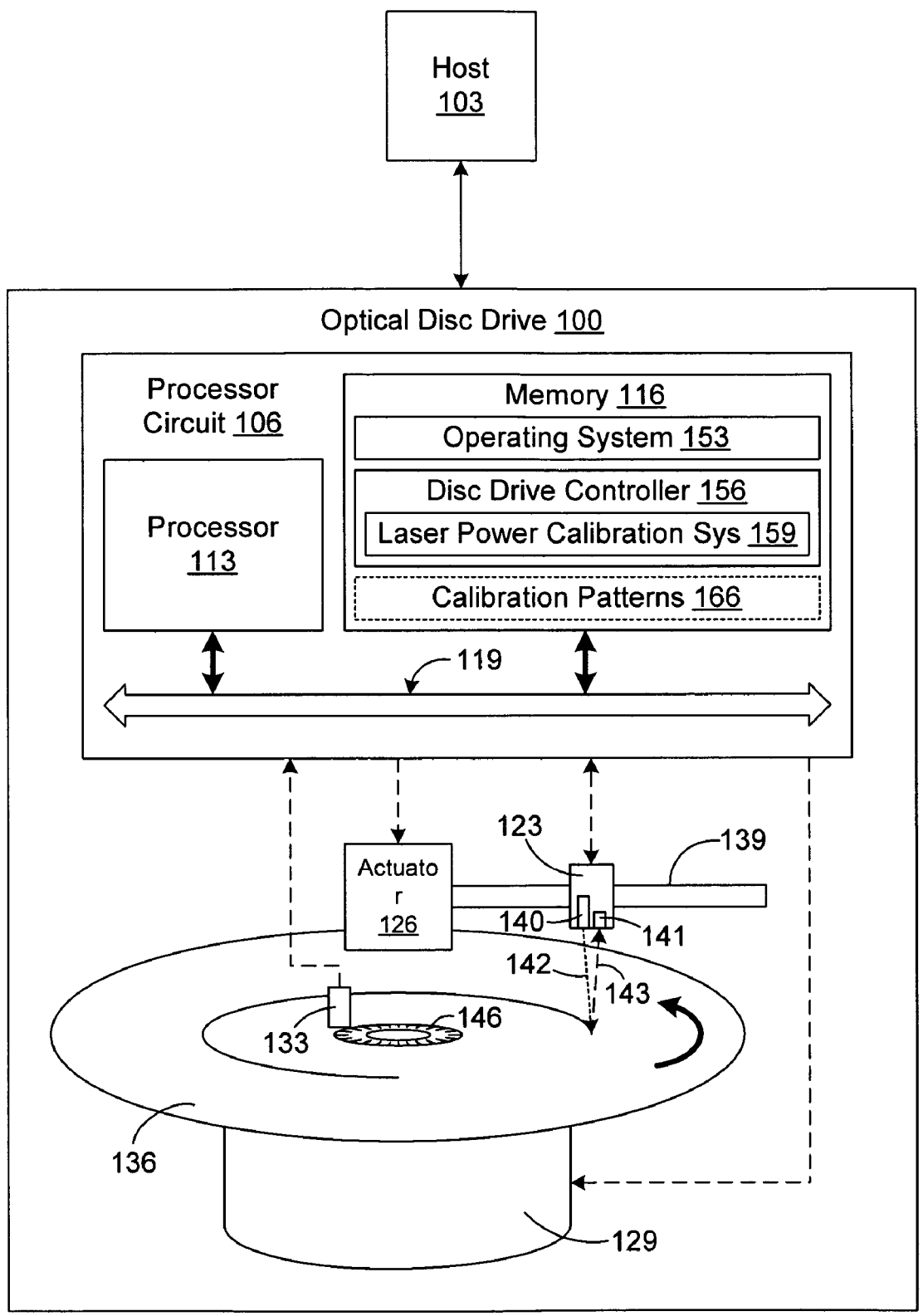
FIG. 1 is a block diagram of an optical disc drive that employs laser power calibration according to an embodiment of the present invention.

With reference to FIG. 1, shown is an optical disc drive 100 according to an embodiment of the present invention. The optical disc drive 100 is in data communication with a host 103. In this respect, the host 103 may be, for example, a computer system, server, or other similar device. For the purposes of the following discussion, first the structural aspects of the optical disc drive 100 are discussed. Thereafter, the operation of the optical disc drive 100 is discussed with respect to the calibration of a laser power setting according to the various embodiments of the present invention.

In one embodiment, the optical disc drive 100 includes a processor circuit 106. The processor circuit comprises a processor 113 and a memory 116, both of which are coupled to a local interface 119. In this respect, the local interface 119 may be, for example, a data bus with an accompanying control/address bus as can be appreciated by those with ordinary skill in the art. The optical disc drive 100 further includes an optical pickup unit 123, an actuator 126, a spindle 129, and a positional sensor 133. When in use, an optical disc 136 is placed on the spindle 129 as shown. The optical pickup unit 123, actuator 126, spindle 129, and positional sensor 133 are all operatively or electrically coupled to the processor circuit 106. In particular, these components are coupled to the processor circuit 106 by way of an electrical connection through which electrical signals may be received from or transmitted by the processor circuit 106 in orchestrating the operation of the optical disc drive 100 as will be described. In one implementation, the optical pickup unit 123, actuator 126, spindle 129, and the positional sensor 133 are coupled to the local interface 119 through appropriate interface circuitry (not shown) as can be appreciated.

The actuator 126 may comprise, for example, a stepper motor or other such device. The actuator is operatively coupled to the optical pickup unit 123, for example, using a screw shaft 139. In this respect, the actuator 126 may be manipulated by the processor circuit 106 in order to move the optical pickup unit 123 back and forth along the length of the screw shaft 139 during the normal operation of the optical disc drive 100 as will be described. In this respect, the actuator 126 positions the optical pickup unit 123 relative to the optical disc 136 during the normal course of operation of the optical disc drive 100.

The optical pickup unit 123 includes a laser 140 and a sensor 141 that may be employed to read data from the optical disc 136. In this respect, the laser 140 is controlled to generate laser light 142 that is directed to the optical disc 136. The laser 140 may operate at any one of a number of frequencies as can be appreciated by those with ordinary skill in the art. At least a portion of the laser light 142 may reflect off of the optical disc as reflected laser light 143. Data structures are embodied in the optical disc 136 that reflect the laser light 142 as can be appreciated by those with ordinary skill in the art. One or more optical components such as a lens may be employed in the optical pickup unit 123 to focus the laser light 142 generated by the laser 140 or to focus the reflected laser light 143 as can be appreciated.

The sensor 141 detects reflected laser light 143 during a read operation and generates a voltage signal that is applied to the processor circuit 106. The magnitude of the voltage signal generated by the sensor 141 is generally proportional to the magnitude of the incident reflected laser light 143 that falls upon the sensing surface area of the sensor 141. Alternatively, a current signal may be generated by the sensor 141. The sensor 141 may be a single sensor or multiple sensors operating cooperatively. Where multiple sensors are employed as the sensor 141, the voltage signal may be a sum of all of the voltage signals from each of the multiple sensors. Such a signal may be referred to as a "sum signal".

The optical pickup unit 123 may be manipulated to write data to the optical disc 136 by controlling the laser 140 in the optical pickup unit 123 so as to form the data structures in the optical disc. The writing capabilities of the optical disc drive 100 may also be employed to write a label on a label surface of the optical disc 136. Specifically, the label surface of the optical disc 136 is chemically treated so as to change an optical property such as darkness, reflectivity, or color upon being irradiated with laser light from the optical pickup unit 123. Such treatment includes, for example, a coating of thermo-chromic material that has been screen-printed on the label surface such that this material changes from light to dark color when activated by the laser. The thermo-chromic material may comprise, for example, a mixture of color-forming dye, activator, and infrared antenna contained in a polymer matrix. The infrared antenna absorbs the laser energy and converts it to heat. The heat causes the activator, dye, and the polymer matrix to melt, thereby allowing the activator to interact with the dye. The interaction results in a chemical change to the dye that causes a change in color. The label material may vary slightly from manufacturer to manufacturer, or from one disc to another disc, or even from one region on a disc to another region on the same disc. As a consequence, the appearance of the generated label may vary accordingly.

The spindle 129 comprises a motor or other such device that spins the optical disc 136. This motor may be, for example, a stepper motor or other type of motor. In this respect, the optical disc 136 is placed in a seating position relative to the spindle 129. Thereafter, the optical disc 136 may be spun relative to the optical pickup unit 123 and the positional sensor 133. The positional sensor 133 obtains positional data 146 from the optical disc 136 as it rotates on the spindle 129. By virtue of the positional data 146 obtained, the precise location of the optical pickup unit 123 relative to the optical disc 136 can be tracked during calibration of the laser power setting and during writing of a label to the optical disc 136.

The optical disc drive 100 further comprises a number of components stored in the memory 116 and executable by the processor 113 in order to control the operation of the various components of the optical disc drive 100. These components comprise, for example, an operating system 153 and a disc drive controller 156. The disc drive controller 156 is executed by the processor 113 to control the various operations of the optical disc drive 100. In this respect, the disc drive controller 156 orchestrates the general operation of the optical disc drive 100 in writing data to and reading data from optical discs 136. The disc drive controller 156 also orchestrates the operation of the optical disc drive 100 in writing a label on a surface of an optical disc 136.

The disc drive controller 156 includes a laser power calibration system 159. The laser power calibration system 159 is executed as a portion of the disc drive controller 156 to calibrate the power of the laser 140 in the optical pickup unit 123 to optimize the writing of a label to the surface of the optical disc 136 as will be discussed. In one embodiment, the optical pickup unit 123 is coupled to the local interface 119 with an interface circuit that includes a register that holds a digital value that controls the power of the laser 140. In one embodiment, the digital value is converted to an analog voltage that drives the laser 140 and determines the power of the laser beam 140 generated thereby. In this respect, the value written to the register in such an interface circuit represents a laser power setting. To adjust or change the power of the laser 140, the laser power setting is correspondingly altered by writing a new value to the register as can be appreciated. Alternatively, the power of the laser 140 may be controlled in some other manner as can be appreciated. The laser power calibration system 159 employs one or more calibration patterns 166 that are written to the surface of the optical disc 136 during the calibration of the laser power setting as will be described.

Where embodied in the form of software or firmware, the disc drive controller 156 and the laser power calibration system 159 may be implemented using any one of a number of programming languages such as, for example, C, C++, Assembly, or other programming languages. The disc drive controller 156 as may be implemented, for example, in an object oriented design or in some other programming architecture. Where any portion of the disc drive controller 156 and/or the laser power calibration system 159 is represented in a flow chart herein, assuming that the functionality depicted is implemented in an object oriented design, for example, then each block of such flow charts may represent functionality that is implemented in one or more methods that are encapsulated in one or more objects.

The memory 116 may comprise, for example, random access memory (RAM), such as, for example, static random access memory (SRAM), dynamic random access memory (DRAM), or magnetic random access memory (MRAM) and other such devices. In addition, the memory 116 may also include, for example, read-only memory (ROM) such as a programmable read-only memory (PROM), an erasable programmable read-only memory (EPROM), an electrically erasable programmable read-only memory (EEPROM), or other like memory device.

In addition, the processor 113 may represent multiple processors and the memory 116 may represent multiple memories that operate in parallel. In such a case, the local interface 119 may be an appropriate network that facilitates communication between any two of the multiple processors, between any processor and any one of the memories, or between any two of the memories etc. The processor 113 may be of electrical, optical, or molecular construction, or of some other construction as can be appreciated by those with ordinary skill in the art.

The operating system 153 is executed to control the allocation and usage of hardware resources such as the memory, processing time and peripheral devices in the optical disc drive 100. In this manner, the operating system 153 serves as the foundation on which applications depend as is generally known by those with ordinary skill in the art.

Next, the general operation of the optical disc drive 100 in writing a label to an optical disc 136 is described according to an embodiment of the present invention. The disc drive controller 156 controls the operation of the various components of the optical disc drive 100 in order to write a label onto the surface of the optical disc 136. The disc drive controller 156 also controls the operation of the various components of the optical disc drive 100 when writing data to and reading data from the optical disc 136. However, discussion of the writing and reading tasks are not described herein in detail.

To the extent that the disc drive controller 156 orchestrates the operation of the various components of the optical disc drive 100 in order to write a label onto the surface of the optical disc 136, it controls the movement of the optical pickup unit 123 by manipulating the actuator 126 to cause the optical pickup unit 123 to move along the screw shaft as needed. In addition, the disc drive controller 156 controls the rotation of the optical disc 136 by controlling the speed of the spindle 129. Also, the disc drive controller 156 can control the read and write functions of the optical disc drive 100 by manipulating the optical pickup unit 123 to transmit laser light 142 to the disc. When the optical pickup unit 123 reads data from the disc, then the reflected laser light 143 is sensed by the sensor 141 and a corresponding signal is generated that is applied to the processor circuit 106 through an appropriate interface circuit.

In addition, the disc drive controller 156 causes the optical pickup unit 123 to focus the laser 142 as it is directed at the optical disc 136. In this respect, the focusing function may be performed continuously while the optical disc 136 spins and the laser 142 is directed thereto during the performance of label writing functions, or other operations.

The disc drive controller 156 also tracks the position of the optical disc 136 based upon inputs from the positional sensor 133. In particular, the positional sensor 133 senses the passing of spokes 146 disposed on the optical disc 136 near, for example, the center, although the spokes may be located at some other position on the optical disc 136. Each time a spoke 146 passes the positional sensor 133, the positional sensor 133 generates a pulse that is received by the disc drive controller 156 by way of the local interface 119. In this respect, each pulse may be viewed as a signal or an interrupt that informs the disc drive controller 156 of a component rotation of the optical disc 136. To track the actual location of the optical disc 136 based upon the pulses, the disc drive controller 156 may include a counter that counts the pulses up to a total number of pulses in a single rotation to determine the actual position of the optical disc 136 at a given time.

Thus, the location of the laser beam generated by the optical pickup unit 123 relative to the optical disc 136 may be determined at any given time by virtue of the positional data tracked by the disc drive controller 156 based upon the data generated by the positional sensor 133. In particular, the location of the optical pickup unit 123 relative to a predefined position on the optical disc 136 of each pixel or segment of a label that is to be written to the optical disc 136 may be calculated based upon the relative positions of each of the spokes 146 sensed by the positional sensor 133.

By virtue of the above-mentioned components, the disc label controller 153 orchestrates the writing of a label on a surface of the optical disc 136. In this respect, the label to be written to the circular optical disc 136 may be embodied in the form of radial data that comprises a number of concentric and adjacent circular tracks, or that comprises a spiral.

When writing the label in the form of circular tracks to the optical disc 136, each track is received from the host 103 and temporarily stored in the memory 116. In some embodiments, the memory 116 may not be large enough to accommodate all of the tracks of the label that is written to the surface of the optical disc 136. Consequently, the host 103 transmits the tracks to the optical disc drive 100 for temporary storage in the memory 116. The rate at which the tracks are transmitted is typically chosen so as to maintain a minimum number of tracks in the memory 116 at all times during a label writing operation so that the appropriate number of tracks are always present within the memory 116 when they are needed for labeling the optical disc 136.

To properly write a label to the label surface of the disc 136, the laser power setting is specified so that power of the laser 140 results in the desired marking of the various pixels that make up the label. If the power of the laser 140 is too low, then the marks on the respective pixels will be too light and the quality of the resulting label would be diminished. Also, such light marks tend to fade over time, further reducing the quality of the label.

On the other hand, if the power of the laser 140 is too high, then the temperature of the coating on the label surface becomes too high. As a result, the coating tends to sputter and may leave deposits on a lens associated with the optical pickup unit 123. This is called "ablation". Ablation of the coating on the label surface that leaves deposits on lenses associated with the optical pickup unit 123 can degrade the label writing performance of the optical disc drive 100 over time. Note that a particular pixel may be written to multiple times, provided that there is adequate cooling between writes so that the ultimate temperature of the coating never reaches a point where sputtering occurs over the course of multiple writes.

Thus it is desirable to set the laser power such that the darkest possible marks on pixels can be made without causing ablation. When optical disc drives 100 are manufactured at the factory, the laser power setting may be optimized for the best performance. However, when the optical disc drive 100 is used over time, degradation inevitably occurs. Specifically, dust and other particles generally collect on the lens that focuses the laser 140, thereby reducing the power of the laser that actually strikes the label surface of the optical disc 136. Also, the laser 140 itself my suffer degradation in performance over time, further reducing the laser power. As a consequence, the label writing capability of the optical disc drive 100 may be significantly degraded over time.

In order to address the problem of degradation in the ability of the optical disc drive 100 to write labels to the label surface of optical discs over time, in various embodiments, the present invention provides for the calibration of the power of the laser 140. Specifically, various embodiments of the laser power calibration system 159 are described that provide for the calibration of the laser power on an ongoing basis over time. Each embodiment of the laser power calibration system 159 is discussed with reference to the figures that follow.

Figure 2:
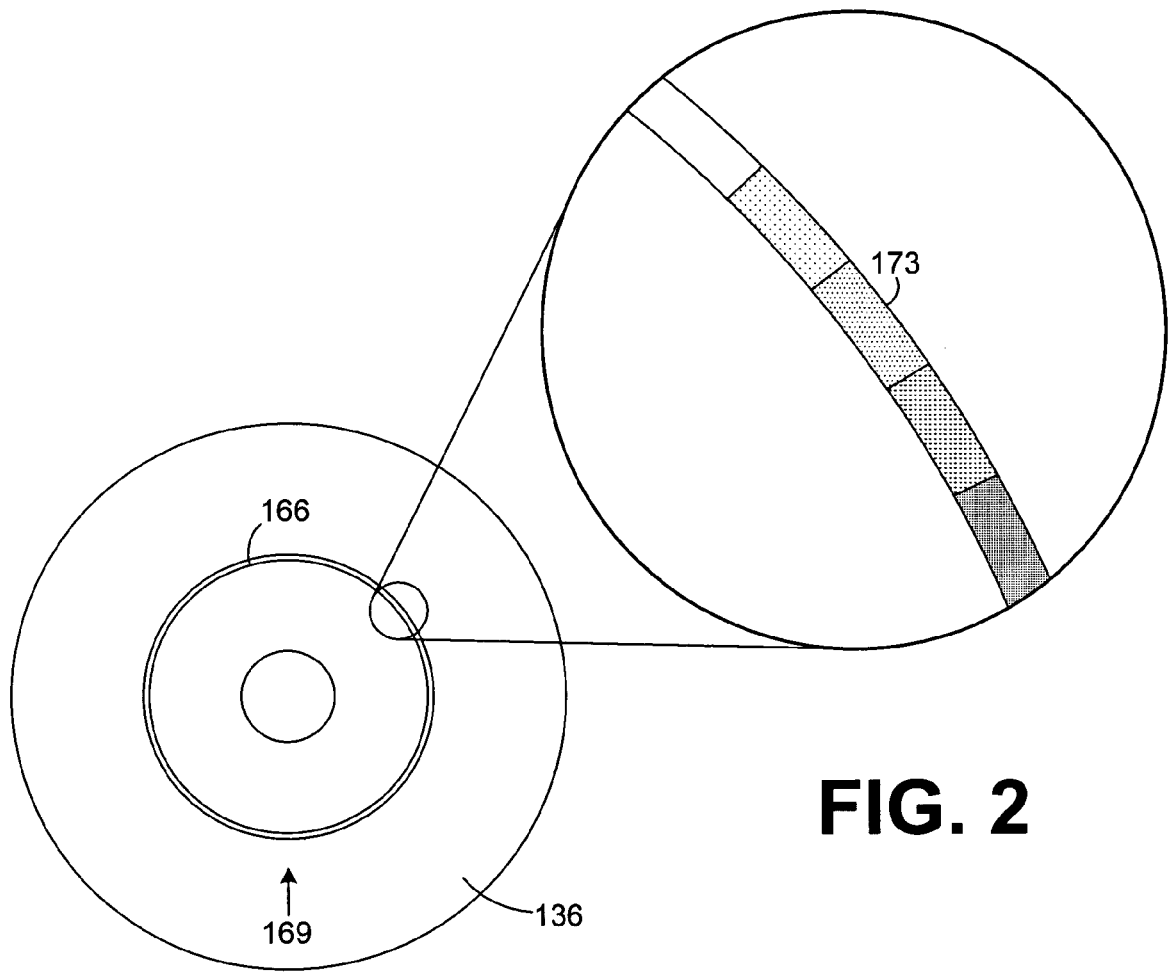
FIG. 2 is a drawing of an optical disc to which a calibration pattern is written in the optical disc drive of FIG. 1 according to an embodiment of the present invention.

With reference to FIG. 2, shown is a drawing of an optical disc 136 with a calibration pattern 166 written, for example, on a track 169 of the optical disc 136. The calibration pattern 166 comprises, for example, a repeated pattern of segments 173 written thereto. For all of the embodiments described herein, the size of the segments 173 may vary as is appropriate. For example, in one embodiment, the segments 173 may be the size of a single pixel, for example, of a label to be written to the label surface of the optical disc 136. Alternatively, each segment 173 may be the size of two or more adjacent pixels of the label. In writing a calibration pattern 166 to the optical disc 136, the laser power calibration system 159 (FIG. 1) activates the laser 140 (FIG. 1) at predefined laser power settings for each segment 173 to deliver a desired quantum of radiant energy in the form of laser radiation to the label surface of the optical disc 136. When the laser 140 is activated for a specific segment 173, the segment 173 is deemed to be a "marked segment". Until the laser 140 is activated for respective segments 173, then they are deemed to be "unmarked segments".

The darkness of a marked segment 173 depends upon the quantum of radiant energy that is delivered to the label surface at the location of the marked segment 173 by the laser 140. The total amount of radiant energy delivered to a given segment depends upon the "dwell" time of the laser 140 with respect to the given segment which, in turn, depends upon the rotational speed of the spindle 129 (FIG. 1) and the power of the laser 140. Where the rotation speed of the spindle does not change, then the power of the laser 140 is adjusted by altering the laser power setting to deliver more or less radiant energy to the label surface at the location of the respective segments 173.

The calibration patterns 166 may vary significantly, depending upon the particular laser power calibration approach employed as will be described. For example, the calibration pattern 166 may comprise creating a plurality of repeated arrays of marked segments 173. Each array of marked segments 173 is created using multiple different laser power settings applied to the laser 140. In this respect, each array of marked segments 173 is created with multiple different quanta of radiant energy from the laser 140. Thus, each marked segment 173 in such an array is created using a quantum of radiant energy from the laser 140 that differs from the quantum of radiant energy applied to the remaining marked segments 173 in the array. Such an array may include, for example, marked segments that present a spectrum of darkness, from very light to very dark marked segments 173.

Alternatively, the calibration pattern 166 may comprise marking all of the segments 173 with a single laser power setting, thereby creating multiple marked segments of relatively uniform darkness. In addition, the same calibration pattern 166 may be written over the same segments multiple times. In this respect, each of the marked segments 173 may be written to multiple times using the laser 140. Each time a respective segment is written to by the laser 140, it becomes darker and darker as the total quantum of radiant energy applied to the marked segment comprises an aggregate of the radiant energy from the repeated application of the laser 140.

In another alternative, the calibration pattern 166 may comprise a "stitch" pattern that includes both marked and unmarked segments 173. In one embodiment, the marked and unmarked segments 173 comprise pairs that are in relative proximity to each other on the optical disc 136. By virtue of the stitch pattern, it may be possible to ascertain the difference in reflectivity between the marked and unmarked segments 173 as will be discussed.

Even though one or perhaps more tracks on the optical disc 136 may be marked with a given calibration pattern 166 during calibration of the laser power, the calibration pattern 166 will not degrade or otherwise mar the label to be written to the label surface of the optical disc 136. This is because a single track on the optical disc 136 is typically only a few microns in width and a calibration pattern 166 written to a single track would not be wide enough to be perceived by the naked eye. In addition, in one embodiment the calibration pattern 166 is written to the innermost or outermost portion or track of the optical disc 136 to minimize interference with the label to be written in the remaining portion of the optical disc 136. As an additional alternative, the calibration pattern 166 may be written on any track on the optical disc 136. In still an additional alternative, the calibration pattern 166 may be written over segments that are to be marked as part of the label that is written to the label surface of the disc 136.

Once a calibration pattern 166 has been written to the label surface of the optical disc 136, then a reading of the reflectivity of the marked segments 173 of the calibration pattern 166 may be taken. This is done by positioning the optical pickup unit 123 (FIG. 1) over the marked segments 173 such that the sensor 141 receives any reflected laser light 143 (FIG. 1) from the respective marked segment 173. Thereafter, the laser power setting is set at a low setting that results in laser radiation of diminished power that is not powerful enough to impart enough radiant energy resulting in further darkening of the respective marked segment 173. Such a low laser power setting is defined herein as a "reflectivity read" setting. In one embodiment, the reflectivity read setting comprises setting a laser power of 5 mW, although other low power settings may be employed. Once the laser 140 is activated at the reflectivity read setting, an amount of reflected laser light 143 is detected by the sensor 141. The amount of reflected laser light 143 detected depends upon the darkness of the respective marked segment 173 for which the reflectivity is measured.

Figure 3:
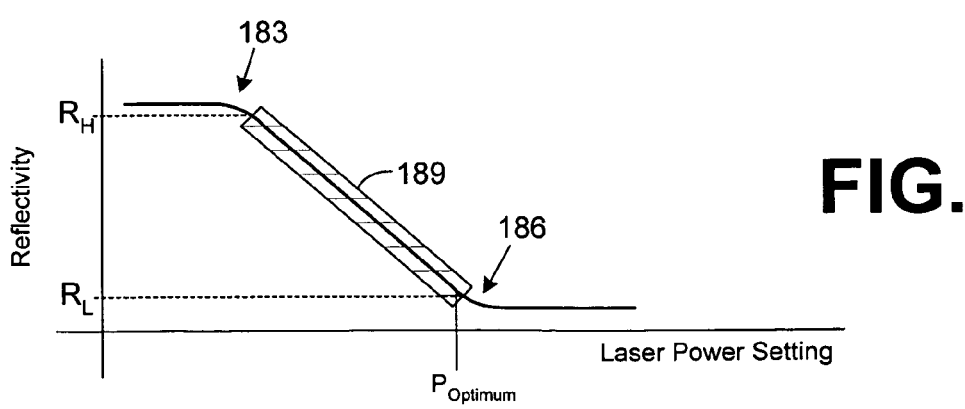
FIG. 3 is a graph that depicts a reliable range of reflectivity sensed from segments on an optical disc in the optical disc drive of FIG. 1 according to an embodiment of the present invention.

With these concepts in mind, reference is made to FIG. 3 that depicts a graph of the reflectivity sensed from marked segments 173 as a function of the laser power setting. In particular, the laser power settings depicted are those that deliver the quantum of radiant energy needed to mark a segment 173 resulting in the darkness that, in turn, results in the corresponding reflectivity depicted in the graph. The actual quantum of radiant energy may be delivered in a single laser write cycle or over the course of repeated laser write cycles to a given segment 173.

As shown, the reflectivity is relatively flat and high when the laser power setting is relatively low up to a "knee" 183 in the curve. Thereafter, the reflectivity drops with increasing laser power. The reflectivity of segments marked with laser power settings to the left of the knee 183 generally reflect the fact that no perceivable mark is made on segments at such power levels. After the knee, the reflectivity drops in an approximate linear manner until an "ankle" 186 is reached. The ankle 186 represents a point where the measured reflectivity begins to level off in spite of the fact that the laser power setting increases. To the right of the ankle 186, although the curve appear flat in FIG. 3, the reflectivity readings may be unreliable to the right of the ankle 186 and may fluctuate. Also, the reflectivity readings to the right of the ankle 186 may vary due to the onset of possible ablation and other damage to the label surface. However, even though readings of the reflectivity may be unreliable to the right of the ankle 186, it is possible with some label chemistries that the segments will continue to become darker with increasing laser power settings to the right of the ankle 186. The exact behavior with respect to darkening at laser power settings extending to the right of the ankle 186 may be determined empirically. Thus, a region of reliable reflectivity 189 exists between the knee 183 and the ankle 186 in which the reflectivity varies as a function of the laser power setting. The reflectivity within the region of reliable reflectivity 189 ranges from a low reflectivity $R_L$ to a high reflectivity $R_H$.

In the following discussion, various embodiments are provided in which a laser power of the laser 140 is calibrated in the optical disc drive 100 (FIG. 1). In the various embodiments described, a plurality of marked segments 173 of a calibration pattern 166 are written onto a label surface of an optical disc 136 with the laser 140. In this respect, the marked segments 173 are created by the application of assorted quanta of radiant energy from the laser 140 (FIG. 1), depending upon the calibration pattern 166 employed as described above. In this respect, the quantum of radiant energy applied to create each marked segment may be from a single application of the laser 140 or may be from multiple applications of the laser 140 as described above.

The reflectivity of the marked segments 173 created with each quantum of radiant energy is measured by taking readings from the sensor 141 in the optical pickup unit 123. Based upon the measured reflectivities of the marked segments for each quantum of radiant energy, the power of the laser 140 is set for writing a label.

Figure 4:
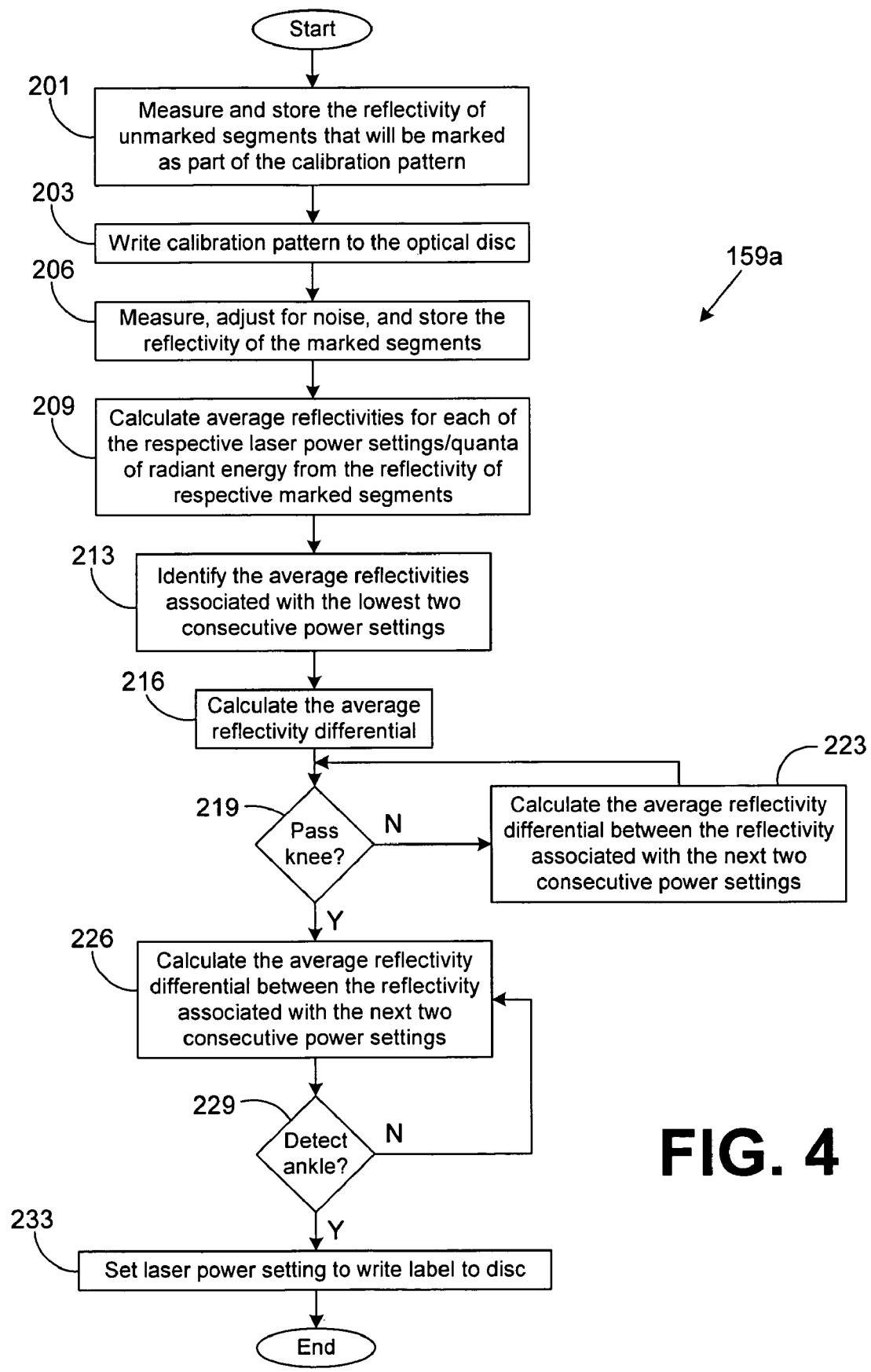
FIG. 4 is a flow chart of an embodiment of a laser power calibration system employed in the optical disc drive of FIG. 1 according to an embodiment of the present invention.

Referring next to FIG. 4, shown is a flow chart that provides one example of the operation of the laser power calibration system 159, denoted herein as laser power calibration system 159a, according to an embodiment of the present invention. Alternatively, the flow chart of FIG. 4 may be viewed as depicting steps of an example of a method implemented in the optical disc drive 100 (FIG. 1) to calibrate the power of the laser 140 (FIG. 1) for use in writing a label to the label surface of the optical disc 136 (FIG. 1).

Beginning with box 201, the laser power calibration system 159a measures and stores the reflectivity of unmarked segments that will be marked as part of the calibration pattern 166 (FIG. 2). In this respect, a reflectivity of each of the segments 173 is obtained before they have been written to by the laser 140. This is done, for example, with the laser power setting at the reflectivity read setting. By obtaining a reading of the reflectivity of the unmarked segments as such, an amount of noise resulting from process variation in the coating of the label surface that affects the reading of the reflectivity of pixels is determined. Then, box 203, the laser power calibration system 159a implements a writing of a calibration pattern 166 (FIG. 2) on the unmarked portion of the optical disc 136 (FIG. 1) that was measured in box 201. In this respect, the calibration pattern 166 may be written on a designated track 169 (FIG. 2) as described above. Alternatively, the calibration pattern 166 may be written onto segments 173 (FIG. 2) that are to be marked during the course of writing the label onto the label surface of the disc 136. The calibration pattern 166 written to the optical disc 136 comprises the number of arrays of marked segments 173, where each array of marked segments 173 includes segments created with multiple different quanta of radiant energy from the laser 140. In this respect, the array of marked segments 173 may comprise a number of segments 173 that are marked with the laser 140 set at successively greater laser power settings for a given rotational speed, thereby delivering successively greater quanta of radiant energy to each segment 173 in the array. Stated another way, the marked segments 173 of the array are written with successively higher laser power settings from the first marked segment 173 to the last marked segment 173 in the array. For example, the array may comprise ten different marked segments 173, each segment being marked with the laser 140 set at one of ten different laser power settings. Such an array may be viewed as a "stair step" configuration of marked segments 173.

In one embodiment, the array of marked segments 173 is repeated on a given track of the optical disc 136 multiple times to provide for a number of reflectivities for each laser power setting or quantum of radiated energy delivered to the respective marked segments 173 so that an average reflectivity for each laser power setting/quantum of radiated energy may be calculated.

Next, in box 206, the laser power calibration system 159a implements a measuring, adjustment, and storing of the reflectivity of each of the marked segments 173 of the respective calibration pattern 166 written to the optical disc 136. To adjust the reflectivity readings obtained, the reflectivities measured in box 201 are subtracted from the corresponding reflectivities measured in box 206. In this respect, the measurements of the reflectivity obtained in box 206 are adjusted for noise created due to the process variation in the coating on the label surface on the optical disc 136. Thereafter, in box 209, the average reflectivities associated with each respective quanta of radiant energy or with each laser power setting are calculated from the reflectivity of the respective marked segments 173 as obtained in box 206 above. Alternatively, rather than obtaining an average reflectivity for each quanta of radiant energy, a select reflectivity measured and adjusted from one of the marked segments 173 in box 206 for each quanta of radiant energy may be employed. In such a situation, box 209 may be omitted.

In addition, even though the various embodiments of the present invention discussed herein are described as employing average reflectivities for the various purposes noted, in general it is understood that non-averaged reflectivity measurements may be employed directly for the various purposes described. In such case, any steps, logic, or code specified to determine an average reflectivity in the various embodiments described herein may be omitted as appropriate.

Next, in box 213, the average reflectivities associated with the lowest two consecutive laser power settings or quanta of radiant energy are identified for further analysis. In this respect, the marked segments 173 were thus written with a range of laser power settings, thus resulting in a range of quanta of radiant energy applied to the various marked segments 173 as described above.

Next, in box 216, a differential in the average reflectivity between the two reflectivities identified in box 213 is calculated. Given that the lowest two reflectivities are likely to be to the left of or otherwise near the knee 183 (FIG. 3) of the curve described above with reference to FIG. 3, it is unlikely that the differential between the two average reflectivities will be very large. Thus, in box 219, the laser power calibration system 159a determines whether the average reflectivities fall to the right or the left of the knee 183 in the reflectivity curve of FIG. 3. This may be determined, for example, by ascertaining whether the differential between the two current consecutive reflectivities is greater than a predefined threshold indicating that the reflectivities fall to the left of the knee 183 where a greater slope exists.

If the average reflectivities fall to the left of the knee 183 as identified in box 219, then the laser power calibration system 159a proceeds to box 223. Otherwise, the laser power calibration system 159a progresses to box 226.

Assuming that the laser power calibration system 159a has proceeded to box 223, then the average reflectivities of the next consecutive two power settings, including the highest of the previous consecutive power settings, are identified for further analysis. Thereafter, the laser power calibration system 159a reverts to box 219 as shown. Thus, the laser power calibration system 159a remains in a loop in boxes 219 and 223 until the average reflectivities indicate that a laser power setting has been reached, where the quantum of radiant energy delivered is such that the resulting reflectivities fall to the right of the knee 183 inside of the region of reliable reflectivity 189 (FIG. 3). In this respect, the laser power settings corresponding to the location of the knee 183 are identified.

Given that the reflectivities measured to the right of the knee 183 fall within the region of reliable reflectivity 189, then an appreciable differential should exist between the reflectivity readings taken for consecutive laser power settings. Once the laser power settings are sufficiently high that the ankle 186 has been reached, then the reflectivity difference between two consecutive average reflectivities should diminish given that the drop in the reflectivity no longer occurs as was the case within the region of reliable reflectivity 189. This is because the reflectivity to the right of the ankle 186 is somewhat unpredictable, but is generally flat relative to the slope of the reflectivity in the region of reliable reflectivity 189.

Thus, in box 226, the laser power calibration system 159a calculates the average reflectivity differential between the reflectivities associated with the next two consecutive power settings that include the one of the reflectivities of the previous highest laser power setting. Thereafter, in box 229, the laser power calibration system 159a determines whether the ankle 186 (FIG. 3) has been detected due to the fact that the differential is less than a predefined threshold as described above. If such is the case, then the laser power calibration system 159a proceeds to box 233. Otherwise, the laser power calibration system 159a reverts back to box 226 as shown. Thus, in boxes 226 and 229 are repeatedly performed in a loop until the laser power calibration system 159a detects the ankle 186 as described.

Assuming that the ankle 186 has been detected in box 229, then in box 233 the laser power setting of laser 140 is set at an optimal laser setting relative to the laser power settings associated with the location of the knee 183 and the ankle 186 that results in a maximum darkness for marked segments without ablation or sputtering. For some label chemistries, the optimal laser power setting may be the lower of the current two consecutive power settings for which the last average reflectivity differential was calculated in box 226. Alternatively, the laser power setting may be set at a value that is a predefined interval to the right of the ankle 186. This interval may be a predefined offset, for example, or a predefined percentage of the difference of the laser power setting between the ankle 186 and the knee 183. Also, for still other label chemistries, the optimal laser power setting may be located at some predefined point between the knee 183 and the ankle 186. The precise location of the optimal laser power setting relative to the locations of the knee 183 and/or the ankle 186 may be determined empirically for each label chemistry. The ultimate optimal laser power setting is then used for writing segments of a label to the label surface of the optical disc 136 as the maximum darkness for the segments written is achieved without ablation or sputtering as was described above.

In an additional embodiment, once the laser power setting is identified in box 233, the laser power settings for those segments in each array that generated a reflectivity in the region of reliable reflectivity 189 may be employed to generate various levels of darkness that fall on a grey scale to provide for a greater range of darkness to be employed in writing the ultimate image to the label surface of the optical disc. In particular, in writing the label to the label surface, the laser power settings may be employed to generate segments of varying darkness, depending upon the desired shade of grey needed in the image.

In addition, it may be the case that noise occurs in the reflectivity sensed from the segments marked as part of the calibration pattern 166. Consequently, the interval between any two laser power settings is specified so as to ensure that average reflectivity differentials calculated are not compromised by the level of the noise.

Figure 5:
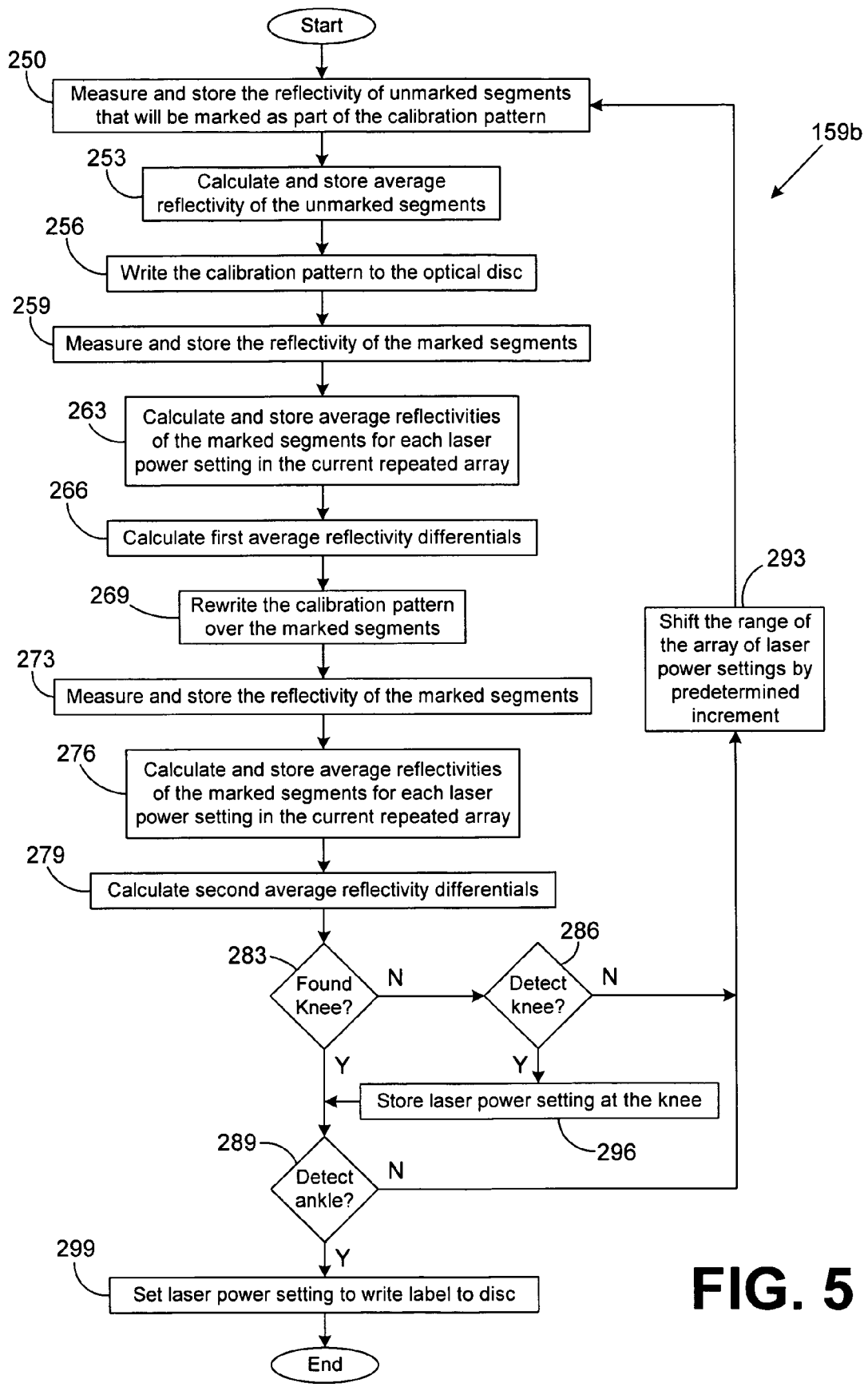
FIG. 5 is a flow chart of an additional embodiment of a laser power calibration system employed in the optical disc drive of FIG. 1 according to an embodiment of the present invention.

Referring next to FIG. 5, shown is a flow chart that provides another example of the operation of the laser power calibration system 159, denoted herein as laser power calibration system 159b, according to an embodiment of the present invention. Alternatively, the flow chart of FIG. 5 may be viewed as depicting steps of an example of a method implemented in the optical disc drive 100 (FIG. 1) to calibrate the power of the laser 140 (FIG. 1) for use in writing a label to the label surface of the optical disc 136 (FIG. 1). The flow chart of FIG. 5 illustrates an approach to calibrate the power of the laser 140 that compares reflectivity differentials obtained from various measurements of the reflectivities at measured arrays of predefined laser power settings.

Beginning with box 250, the laser power calibration system 159b measures and stores the reflectivity of unmarked segments that will be marked as part of the calibration pattern 166 (FIG. 2). In this respect, a reflectivity of each of the segments 173 is obtained before they have been written to by the laser 140. Next, in box 253, the average reflectivity is calculated from the reflectivities of each of the individual unmarked segments 173. Thereafter, in box 256, the laser power calibration system 159b writes the calibration pattern 166 to the optical disc 136 (FIG. 1). In this respect, the calibration pattern 166 comprises, for example, a number of repeated arrays of segments, where the laser power settings vary within each array across a predefined range of laser power settings. In one embodiment, the range of laser power settings is less than a total operating range of the laser 140.

For example, assume that the laser power setting has an operating range from 0 to 40 milliwatts. The range of the laser power settings of the array may be, for example, 10 to 20 percent of the total operating range. For example, if the range of laser power settings of the array covered a range that was 20% of the operating range from 0 to 40 milliwatts (mW), then the range of laser power settings may be 0 to 8 mW. In this respect, the range of laser power settings is a subset or window within the total operating range of the laser 140. The range or window of 8 mW, for example, may be shifted up and down the operating range of the laser 140 in order to detect the knee 183 and ankle 186 as will be described. In this respect, the range or window may be, for example, 0 to 8 mW, 30-38 mW, or other window within the operating range of 0 to 40 mW. The array comprises a plurality of specific laser power settings. For example, assuming that the array fell between 0 and 8 mW, and assuming a resolution of 10 total laser power settings, the specific laser power settings may be, for example, 0.8 mW, 1.6 mW, 2.4 mW, 3.2 mW, and so on.

Alternatively, the calibration pattern 166 may be written over a plurality of marked segments that comprise pixels of an image that is to be written to the surface of the optical disc 136. In this respect, no segments 173 are marked solely for the purposes of calibration, where ultimately the only marked segments appearing on the optical disc 136 comprise the pixels of the image itself after the image is created. However, to the extent that the segments marked for purposes of calibration are not perceivable to the naked eye, any segments marked for calibration that are not part of the ultimate image may be of little consequence to the resulting image.

Next, in box 259, the reflectivity of each of the marked segments 173 of the current repeated array written to the optical disc 136 is measured and stored in the memory 116 (FIG. 1). Then, in box 263, an average reflectivity is calculated for each laser power setting in the array applied to the optical disc 136 from the reflectivities of each of the individual marked segments 173 of the arrays written as part of the calibration pattern. Thereafter, in box 266, for each of the laser power settings of the repeated array written to the optical disc 136 as the calibration pattern, a first average reflectivity differential is calculated between the respective average reflectivities calculated in box 263 and the average reflectivity calculated in box 253 above. The first average reflectivity differentials may be calculated, for example, by subtracting the average reflectivities calculated in box 263 for each laser power setting in the repeated array from the average reflectivity of the unmarked segments calculated in box 253 above.

Thereafter, in box 269, the calibration pattern 166 is rewritten over the marked segments 173 that were measured as set forth in box 250 and previously marked as set forth in box 256 above. To ensure that sputtering or ablation does not occur, the rewriting of the calibration pattern 166 in box 269 is performed after the marked segments have cooled sufficiently after the writing of the calibration pattern 166 in box 259 above. By rewriting the calibration pattern 166 over the same marked segments 173, the reflectivity of each respective marked segment should decrease accordingly as the ultimate quantum of radiant energy applied to such segments 173 has doubled, thereby darkening the marked segments.

Next, in box 273, the reflectivity of the marked segments 173 is measured a second time and stored in the memory 116. Thereafter, in box 276, a second average reflectivity is calculated for each laser power setting in the repeated array of the calibration pattern from the reflectivities of each of the respective marked segments 173. Then, in box 279, for each of the laser power settings of the repeated array written to the optical disc 136 as the calibration pattern, a second average reflectivity differential is calculated. This is determined by subtracting the first respective average reflectivities calculated in box 263 after the calibration pattern 166 is first written to the disc 136 from the corresponding second average reflectivities calculated in box 276 after the calibration pattern 166 is written to the optical disc 136 a second time.

In box 283, the laser power calibration system 159b determines whether the knee 183 (FIG. 3) in the reflectivity curve has already been detected. If not, then the laser power calibration system 159b proceeds to box 286. Otherwise, the laser power calibration system 159b progresses to box 289.

In box 286, the laser power calibration system 159b attempts to detect the laser power setting that coincides with, or is centered at the knee 183. This may be accomplished, for example, by examining the first and second average reflectivity differentials for each laser power setting written to the optical disc 136. Specifically, the first and second average reflectivity differentials are both relatively small and approximately equal when the reflectivities measured in boxes 259 and 273 fall to the left of the knee 183 as no appreciable mark has been made on the respective segments. The first and second average reflectivity differentials may both be relatively large and approximately equal when the reflectivities measured in boxes 259 and 273 fall between the knee 183 and the ankle 186. Also, the first and second average reflectivity differentials are both relatively small and approximately equal when the reflectivities measured in boxes 259 and 273 fall to the right of the ankle 186. The first and second average reflectivity differentials differ when the reflectivities measured in boxes 259 and 273 approach either the knee 183 or the ankle 186. With the foregoing in mind, the laser power calibration system 159b may be configured to detect the location of the knee 183 and the ankle 186 based upon the first and second average reflectivity differentials. Alternatively, in another embodiment, the value of the second average reflectivity differential may be employed to find the knee 183 and the ankle 186.

If in box 286, the laser power calibration system 159b does not detect the knee 183, then the laser power calibration system 159 proceeds to box 293. Otherwise, the laser power calibration system moves to box 296. In box 293, the range of the laser power settings of the repeated array written to the optical disc 136 as the calibration pattern is shifted to the right by increasing an offset associated with the range. For example, if the range was from 0 to 8 mW, it may be shifted by an increment of 1 mW to a range of 1 to 9 mW. According to one embodiment, the offset may be any magnitude, but is typically less than the range itself (i.e. 8 mW) and is not specified so as to move beyond the operating range of the laser 140. Next, the laser power calibration system 159b reverts back to box 250 to begin the process once more with the new range of laser power settings for the repeated array. In this respect, the calibration patterns written once more in boxes 256 and 269 are written over a new set of unmarked segments 173 that may or may not be on a new track, etc.

Assuming that the knee 183 has been detected in box 286, then in box 296, the laser power setting associated with the knee 183 is stored for future use. Thereafter, the laser power calibration system 159b proceeds to box 289.

Assuming that the laser power calibration system 159b has proceeded to box 289, then the laser power calibration system 159b determines whether the ankle 186 can be detected using the first and second average differentials as described above. If so, then the laser power calibration system 159b proceeds to box 299. Otherwise, the laser power calibration system 159b reverts to box 293. In this respect, the laser power calibration system 159b starts with an initial array of laser power settings and, with each cycle of the loop described, the array of laser power settings is shifted over to the right until the knee 183 and the ankle 186 are discovered.

If the ankle 186 is detected as described above in box 289, then in box 299 the laser power setting is set to an optimum laser power setting that would deliver the quantum of radiant energy from the laser 140 that results in the first average reflectivity. Thereafter, the power of the laser 140 is thus calibrated for operation to write a label to the optical disc 136. The optimum laser power setting is determined, for example, based upon the laser power setting at the ankle 186 and the laser power setting at the knee 183 as described above with reference to box 233 (FIG. 4).

Figure 6:
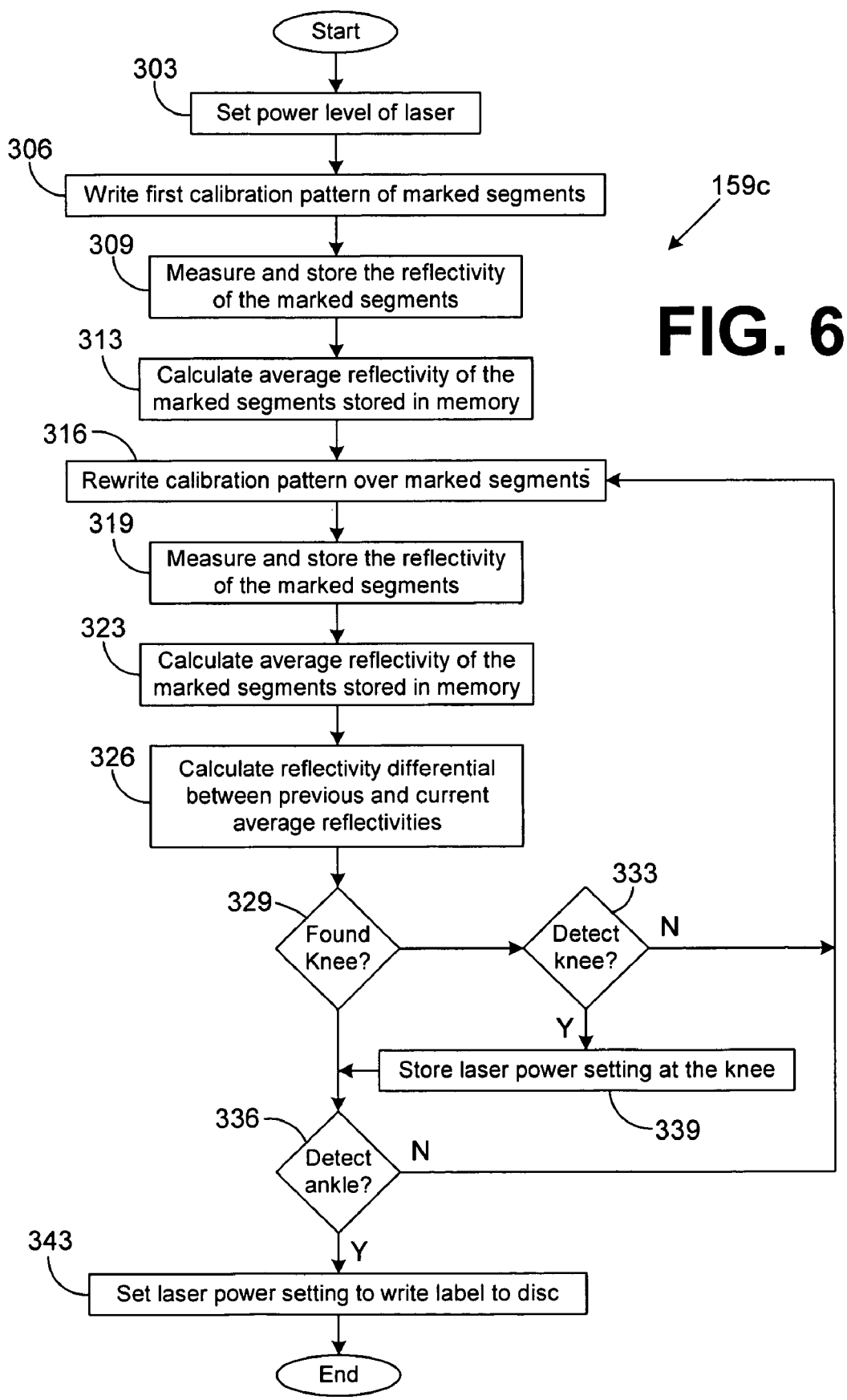
FIG. 6 is a flow chart of an additional embodiment of a laser power calibration system employed in the optical disc drive of FIG. 1 according to an embodiment of the present invention.

Referring next to FIG. 6, shown is a flow chart that provides one example of the operation of the laser power calibration system 159, denoted herein as laser power calibration system 159c, according to an embodiment of the present invention. Alternatively, the flow chart of FIG. 6 may be viewed as depicting steps of an example of a method implemented in the optical disc drive 100 (FIG. 1) to calibrate the power of the laser 140 (FIG. 1) for use in writing a label to the label surface of the optical disc 136 (FIG. 1).

The laser power calibration system 159c employs a "walk-up" approach to detect the ankle 186 (FIG. 3) of the reflectivity curve depicted in FIG. 3. Beginning with box 303, the laser power setting is set at an initial predefined value that causes the laser 140 to deliver a quantum of radiant energy to segments to be marked on the optical disc 136 resulting in a reflectivity on the reflectivity curve that is located to the left of the knee 183. Such a value may be, for example, the lowest possible laser power setting such as the reflectivity read setting. Thereafter, in box 306 a first calibration pattern of marked segments 173 (FIG. 2) is written to the respective track 169 (FIG. 2) of the optical disc 136. Alternatively, the calibration pattern 166 (FIG. 2) may be written to multiple tracks such as is the case, for example, when the calibration pattern 166 is written over the segments of an image to be written to the label surface of the optical disc 136 as described above.

Thereafter, in box 309, the reflectivity of the marked segments 173 of the calibration pattern 166 are measured and stored in the memory 116 (FIG. 1). Also, these measurements may be adjusted for noise by subtracting reflectivity measurements of unmarked segments for a given optical disc 136 as was described with reference to box 206 (FIG. 4) above. In this respect, measurements of the reflectivity of unmarked segments may be taken from the optical disc 136 in a manner as discussed in box 201 (FIG. 4) above. In box 313, the average reflectivity of the marked segments 173 stored in the memory 116 is calculated. Thus, each of the marked segments 173 is marked with the laser 140 set at a single laser power setting, thereby applying the same quantum of radiant energy to each of the marked segments 173. The average reflectivity calculated in box 313 is for each of the marked segments 173 that were created with the same quantum of radiant energy. In box 316, the laser power calibration system 159c implements a rewrite of the calibration pattern 166 over the previously marked segments 173. This is done after a suitable period of time has elapsed for cooling of the marked segments from the writing of the calibration pattern 166 in box 306 to prevent ablation.

In box 319, once again the reflectivity of the marked segments 173 is measured and stored in the memory 116. Also, in box 323 the average reflectivity of the marked segments 173 is calculated and stored in the memory 116. Next, in box 326, a reflectivity differential is calculated between the previous and the current average reflectivities calculated in boxes 313 and 326. Thereafter, in box 329, it is determined whether the knee 183 has already been detected. If not, then the laser power calibration system 159c proceeds to box 333. Otherwise, the laser power calibration system 159c progresses to box 336.

In box 333, the laser power calibration system 159c determines whether the difference calculated in box 326 is greater than a predefined threshold. In this respect, once the reflectivity differential increases, then it may be assumed that the knee 183 has been detected since the reflectivity remains rather flat to the left of the knee 183. The predefined threshold may be, for example, a predefined percentage increase over the lowest previous measurement of the reflectivity used to calculate the reflectivity differential in box 326. The predefined percentage or other threshold value may be stored in memory, etc. Assuming that the knee 183 has been detected in box 333, then the laser power calibration system 159c proceeds to box 339. Otherwise, the laser power calibration system 159c reverts back to box 316.

Assuming that the laser power calibration system 159c has detected the knee 183 in box 333, then in box 339 the laser power setting associated with the knee 183 is stored for future use. Thereafter, the laser power calibration system 159c proceeds to box 336. In box 336, the laser power calibration system 159c detects whether the ankle 186 has been located. Once the knee 183 has been detected in box 333, the ankle 186 may be detected by determining whether the current reflectivity differential is less than a predefined threshold. In this respect, given that the reflectivity decreases with increasing laser power setting in the region of reliable reflectivity 189 (FIG. 3) as described above, then with each increasing write operation over the marked segments using the same laser setting, when in the region of reliable reflectivity 189, the reflectivity should decrease in a generally linear fashion.

Thus as the ultimate quantum of radiant energy from multiple writes is applied to the marked segments 173, with each write operation performed, the reflectivity should be reduced while the laser power settings result in reflectivities within the reliable region of reflectivity 189. When the reflectivity is no longer reduced from one measurement to the next for consecutive reflectivities, then it may be assumed that the laser power setting is at or to the right of the ankle 186, thereby accounting for the lack of reduction in the reflectivity. Thus, a predefined difference threshold is stored in the memory 116 that equals a minimum change in the reflectivity expected between two consecutive laser power settings in the region of reliable reflectivity 189. When the reflectivity difference between previous and current average reflectivities obtained in either block 313 or 326 is less than the predefined threshold difference, it is assumed that the quantum of radiant energy applied to the marked segments 173 corresponds with a laser power setting that places the reflectivity beyond the ankle 186.

Thus, in box 336, if the reflectivity differential is less than the predefined threshold difference such that the ankle 186 is detected, then the laser power calibration system 159c proceeds to box 343 in which the laser power setting is set at the optimal laser setting relative to the laser power settings determined at the knee 183 and the ankle 186 as was described with reference to box 233 (FIG. 4) above. Thereafter, the laser power calibration system 159c ends and the laser power setting is employed to write the ultimate label to the label surface of the optical disc 136.

However, if the ankle 186 is not detected in box 336, then the laser power calibration system 159c reverts to box 316 to rewrite an additional calibration pattern 166 over the marked segments.

Figure 7:
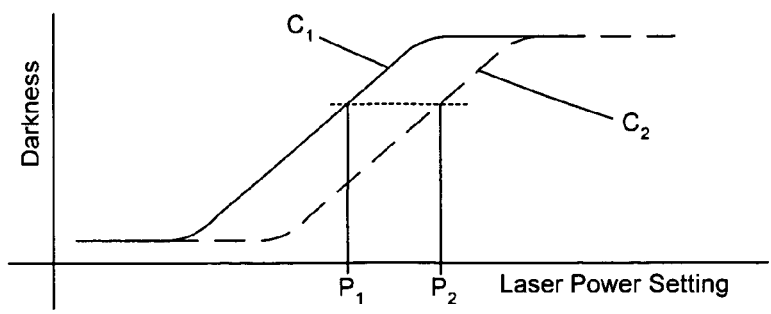
FIG. 7 is a graph that depicts a darkness generated in a segment as a function of a power of a laser in the optical disc drive of FIG. 1 according to an embodiment of the present invention.

With these concepts in mind, reference is made to FIG. 7 that depicts a graph of darkness of marked segments 173 as a function of the laser power setting. The graph includes an initial darkness curve $C_1$ that shows darkness as a function of the laser power setting when the optical disc drive 100 is first manufactured. In particular, a test may be performed to obtain the initial darkness curve $C_1$ in which a pattern is written, for example, to a track 169 of a test optical disc 136 that includes a repeated array of segments showing a range darkness written to the disc using laser power settings ranging from the minimum possible to the maximum possible. Alternatively, the track 169 may be written to several optical discs 136 to obtain data from multiple optical discs 136. Once the pattern is written, the darkness of the segments may be measured using a photo spectrometer. Thereafter, the initial darkness curve $C_1$ may be generated. Thereafter, an initial laser power setting $P_1$ is selected for operation of the optical disc drive 100 in writing labels to the label surfaces of optical discs 136 based upon a desired darkness.

Over time, however, the darkness curve will shift to the right as the laser power is absorbed, for example, by dust collecting on a lens associated with the laser 140 and due to other factors discussed above. Consequently, over time the quantum of radiant energy delivered to a given segment by the laser 140 at the initial laser power setting $P_1$ will diminish over time. In this respect, the initial darkness curve $C_1$ may "shift" to the right on the graph shown in FIG. 7 as shown by the darkness curve $C_2$. Note that it may be the case that the shape of the darkness curve $C_2$ may differ from the shape of the curve $C_1$, where the curves $C_1$ and $C_2$ are provide merely purposes of illustration.

Figure 8:
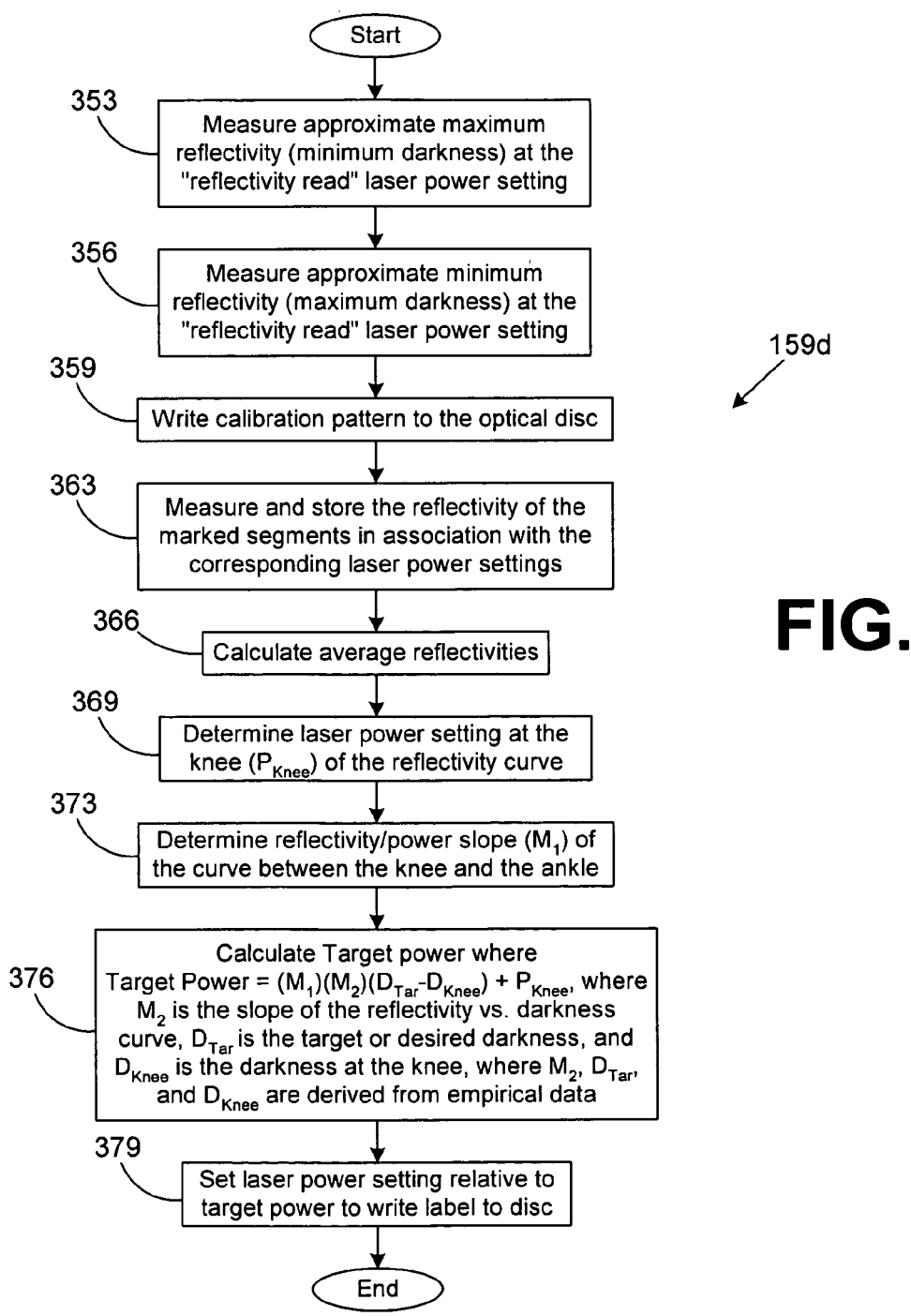
FIG. 8 is a flow chart of an additional embodiment of a laser power calibration system employed in the optical disc drive of FIG. 1 according to an embodiment of the present invention.

With this in mind, reference is made to FIG. 8 that shows a flow chart that provides one example of the operation of the laser power calibration system 159, denoted herein as laser power calibration system 159d, according to an embodiment of the present invention. Alternatively, the flow chart of FIG. 8 may be viewed as depicting steps of an example of a method implemented in the optical disc drive 100 (FIG. 1) to calibrate the power of the laser 140 (FIG. 1) for use in writing a label to the label surface of the optical disc 136 (FIG. 1). As will be described, the laser power calibration system 159d determines a laser power setting that results in a predefined darkness on the label surface of the optical disc 136.

Beginning with box 353, the laser power calibration system 159d implements the measurement of an approximate maximum reflectivity or minimum darkness of the optical disc 136. This measurement is done with the laser power set at the "reflectivity read" setting as described above. The measurement of the maximum reflectivity of the optical disc 136 may be performed by moving the optical pickup unit 123 (FIG. 1) such that the laser 140 is directed to a nearly 100% reflective surface of the optical disc 136 such as an internal ring on the optical disc 136 as can be appreciated by those in ordinary skill in the art. Once the approximation of the maximum reflectivity is measured, it is then stored in the memory 116 (FIG. 1) for future use.

Thereafter, in box 356, a measurement of an approximate minimum reflectivity detectable by the sensor 141 (FIG. 1) is taken at the reflectivity read laser power setting that is either focused at a position of known maximum darkness on the optical disc 136, or the lenses associated with the laser 140 are defocused such that little or no laser light is reflected back to the sensor 141. The minimum reflectivity is then stored in the memory 116. Thus, a range of reflectivity of the optical disc 136 is established from the minimum and maximum reflectivities determined in boxes 353 and 356 above.

Next, in box 359 the laser power calibration system 159*d* implements the writing of a calibration pattern 166 of marked segments to the optical disc 136. As discussed above, the calibration pattern 166 may be written to a predefined track 169 or may be written over segments that correspond to those that are part of the image to be written to the label surface of the optical disc 136 itself. The calibration pattern 166 may comprise, for example, the array of marked segments that are created with different quanta of radiant energy from the laser 140 that is set at correspondingly different laser power settings. Such an array would be repeated around the circumference of the track 169 or within segments that coincide with the pixels of the image to be written to the label surface.

Then, in box 363, the reflectivity of each of the marked segments is measured and stored in the memory 116 in an association with the corresponding laser power settings that were employed to write such marked segments as a part of the calibration pattern 166 in box 359 above. Thereafter, in box 366, an average reflectivity is calculated for each laser power setting employed to generate the marked segments based upon the reflectivity measurements of each of the marked segments 173 (FIG. 2). In this respect, the average reflectivity calculated for each laser power setting falls within the range of reflectivity established in boxes 353 and 356 above. The average reflectivities determined provide the basis for a curve that depicts the average reflectivity as a function of laser power setting similar to the curve of FIG. 3, with the exception that the average reflectivity is shown rather than the reflectivity.

Thereafter in box 369 the laser power setting at the knee 183 (FIG. 3), denoted as $P_{Knee}$, is determined by analyzing the average reflectivities to locate the laser power setting at which the bend of the knee 183 occurs. Then, in box 373, a slope $M_1$ of the average reflectivity/power curve is determined to the right of the knee 183 by analyzing the average reflectivities along the slope of the average reflectivity/power curve. In this respect, the slope $M_1$ is determined at a location on the curve where the average reflectivity decreases with increasing laser power. In one embodiment, the slope $M_1$ is determined between the knee 183 and the ankle 186 (FIG. 3). Once the laser power setting $P_{Knee}$ and the slope $M_1$ are known, then the desired or target laser power setting that results in a target or predefined desired darkness, denoted target darkness $D_{Tar}$, is determined.

In this respect, the target darkness $D_{Tar}$ is determined empirically by marking segments on optical discs 136 and measuring the darkness of these segments using a photo spectrometer in a laboratory environment, etc. For greater accuracy, multiple measurements of the darkness at various laser power settings may be averaged as can be appreciated. In the same manner, a darkness may be determined empirically at the knee 183, denoted herein as darkness $D_{Knee}$. Also, in addition to measuring the darkness of the marked segments, empirical measurements of the reflectivity may also be obtained in a laboratory environment. Thus, from a number of marked segments, a curve may be generated representing the darkness as a function of laser power. Also, a curve representing the reflectivity as a function of laser power may be generated. The data from these curves may be combined to create a curve that depicts the reflectivity as a function of darkness or vice versa. From this combined curve, an approximation of a slope $M_2$ may be obtained of the reflectivity vs. darkness curve. This slope may comprise, for example, the reflectivity as a function of darkness obtained at locations between the knee 183 and the ankle 186.

Thereafter, the target or desired power at which the laser power setting is to be set for general operation may be calculated as follows:

$$\text{Target Power} = M_1 M_2 (D_{Tar} - D_{Knee}) + P_{Knee}.$$

In this respect, given that the slope $M_1$ is expressed in terms of Power/Reflectivity and the slope $M_2$ is expressed in terms of Reflectivity/Darkness, then their product is Power/Darkness. This value multiplied by the value calculated from $(D_{Tar} - D_{Knee})$ results in laser power.

Thus, in box 376, the target power at which the laser power setting is to be set in order to write a label to the label surface of the optical disc 136 is calculated as set forth above. Thereafter, in box 379, the laser power setting of the laser 140 is set relative to the target power to write the label to the label surface of the optical disc 136. In this respect, the laser power setting may be set at or near the target power, or at some predefined interval relative to the target power. Thereafter, the laser power calibration system 159*d* ends as shown.

Figure 9:
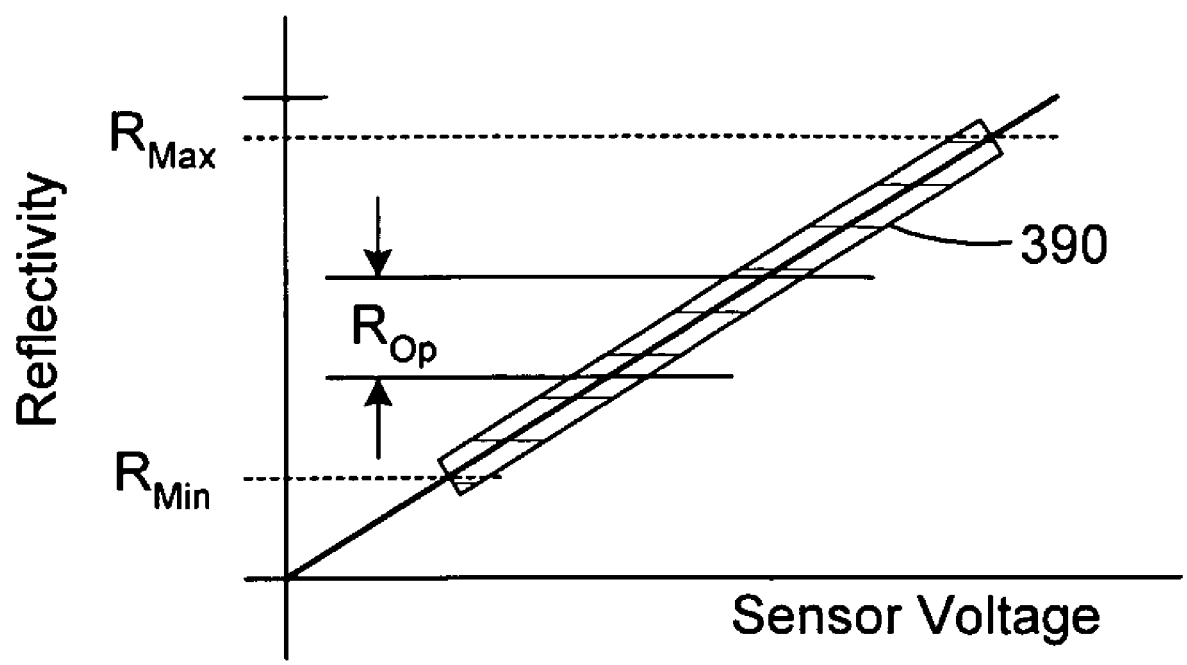
FIG. 9 is a graph that depicts the reflectivity of an optical disc as a function of the voltage of a sensor employed in the optical disc drive of FIG. 1 according to an embodiment of the present invention.

With reference to FIG. 9, shown is a graph that depicts a reflectivity of segments 173 as a function of the voltage detected at the sensor 141 (FIG. 1). Generally the voltage generated by the sensor 141 is proportional to the reflectivity of a given segment 173. This is due to the fact that the voltage is generally proportional to reflected laser light 143 that falls onto the sensor 141. The reflected laser light 143, in turn, is proportional to the reflectivity at a given segment 173 on the optical disc 136. The maximum reflectivity $R_{Max}$ is that reflectivity detected from a location or segment of maximum reflection on the optical disc 136. This point may be found, for example, on a highly reflective inner ring of the optical disc 136 as can be appreciated.

The minimum reflectivity $R_{Min}$ is a minimum reflection that may be obtained from an optical disc 136. This point may be found, for example, by defocusing the laser 140 such that no reflected laser light 143 falls onto the sensor 141. Alternatively, the laser 140 may be pointed to a location or segment of maximum darkness on the optical disk 136 to obtain a reading of the minimum reflectivity $R_{Min}$. Note that the minimum reflection is greater than a zero reflection due to the fact that the sensor may detect some reflected light and due to process variation in the manufacture of the sensors 141 themselves. Between the maximum and minimum reflectivities $R_{Max}$ and $R_{Min}$ is a predefined range of reflectivity 390 relative to the optical disc 136 in the optical disc drive 100. Within the predefined range of reflectivity 390 is an operating range $R_{Op}$. The operating range $R_{Op}$ is the range of reflectivity that is expected when a segment of a desired darkness is written to the optical disc 136. Thus, in one embodiment, the calibration of the laser power involves setting the laser power to ensure that the resulting reflectivity of marked segments 173 (FIG. 2) fall within the operating range $R_{Op}$.

Figure 10:
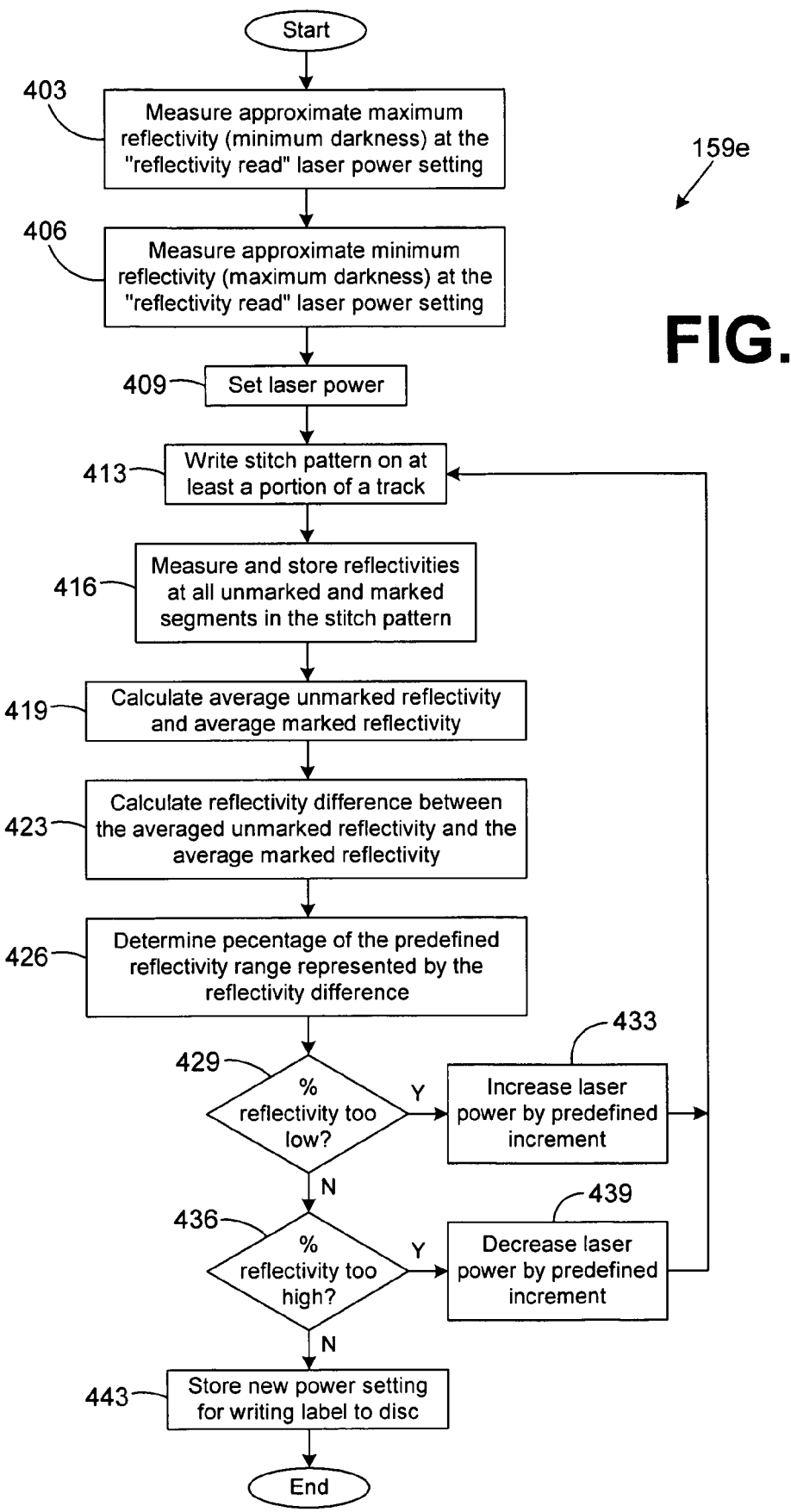
FIG. 10 is a flow chart of an additional embodiment of a laser power calibration system employed in the optical disc drive of FIG. 1 according to an embodiment of the present invention.

Referring next to FIG. 10, shown is a flow chart that provides one example of the operation of the laser power calibration system 159, denoted herein as laser power calibration system 159e, according to an embodiment of the present invention. Alternatively, the flow chart of FIG. 10 may be viewed as depicting steps of an example of a method implemented in the optical disc drive 100 (FIG. 1) to calibrate the power of the laser 140 (FIG. 1) for use in writing a label to the label surface of the optical disc 136 (FIG. 1). The flow chart of FIG. 10 involves the calibration of the laser power as falling within the operating range $R_{Op}$ of the predefined range of reflectivity 390.

In boxes 403 and 406, the maximum reflectivity and minimum reflectivity are both obtained in a manner similar to that discussed with reference to boxes 353 and 356 of FIG. 8. Thereafter, in box 409, the laser power setting is set at an initial power setting at which it is believed the resulting reflectivity will fall within the operating range $R_{OP}$. This setting may be, for example, a setting that is predefined in the memory 116 based upon measurements at the time of manufacture of the optical disc drive 100. Alternatively, the laser power setting may be set at the power setting at which a previous label was written to a prior optical disc 136.

Next, in box 413, a calibration pattern 116 that comprises a stitch pattern is written to at least a portion of a given track 169. The stitch pattern includes a number of pairs of marked and unmarked segments. The respective unmarked and marked segments in a given pair may be adjacent to each other or they may be separated by a number of segments. In one embodiment, the unmarked and marked segments within each pair are adjacent to each other so that they are formed within the same region of the label surface of the optical disc 136 such that there is little variation in the nature of the chemical coating between the two segments 173, given that there may be process variation in the thickness and chemical makeup of the coating itself between different regions of the disc.

Alternatively, where the marked and unmarked segments within a given pair are not adjacent to each other, then they may be located within the same general region of an optical disc 136 so as to ensure that any variation in the coating on the label surface is minimal with respect to both the marked and unmarked segments within a given pair of segments.

Thereafter, in box 416, the reflectivities of all unmarked and marked segments associated with the given pairs in the stitch pattern written to the disc as the calibration pattern in box 413 are measured and stored in the memory 116. Thereafter, in box 419, the laser calibration system 159e calculates an averaged unmarked reflectivity and an average marked reflectivity from all of the unmarked and marked segments of the respective pairs of the stitch pattern. In this respect, the average unmarked reflectivity and the average marked reflectivity provides reflectivity measurements that are taken from multiple positions on the optical disc 136 that should negate any process variation in nature of the coating applied to the label surface. Alternatively, select marked and unmarked reflectivities measured in box 416 may be employed rather than performing averaging as described in box 419. However, such non-averaged values may be susceptible to variation due to process variation in the manufacture of the label surface. In such a case, box 419 may be omitted.

Then, in box 423, an average reflectivity difference is calculated between the average unmarked reflectivity and the average marked reflectivity. This may be done, for example, by subtracting the average marked reflectivity from the average unmarked reflectivity. Alternatively, the reflectivity difference may be calculated from non-averaged reflectivities obtained in box 416 as described above, where the reflectivity difference is not an average reflectivity difference. Thus, one embodiment, the average reflectivity difference may not actually be an averaged difference. Next, in box 426, a percentage of the predefined range of reflectivity represented by the average reflectivity difference is determined. In this respect, the percentage of the reflectivity difference of the total predefined range of reflectivity 390 from the maximum reflectivity $R_{Max}$ to the minimum reflectivity $R_{Min}$ as described above with reference to FIG. 9. To do so, the minimum reflectivity $R_{Min}$ is subtracted from the average reflectivity difference. The remainder of the average reflectivity difference is divided by the magnitude of the predefined range of reflectivity 390 from the maximum reflectivity $R_{Max}$ to the minimum reflectivity $R_{Min}$.

Thereafter, in box 429, the laser power calibration system 159e determines whether the percent reflectivity calculated in box 426 is too low such that it falls below the operating range $R_{OP}$. If such is the case then the laser calibration system 159e progresses to box 433. Otherwise, the laser power calibration system 159e proceeds to box 436.

In box 436, the laser power calibration system 159e determines whether the percent reflectivity is too high such that it falls above the operating range $R_{OP}$. If such is the case, then the laser power calibration system 159e proceeds to box 439. Otherwise, the laser power calibration system 159e proceeds to box 443.

Assuming that the laser power calibration system 159e has progressed to box 433, then the laser power setting is increased by a predefined increment. Such an increment may comprise, for example, 10% of the total possible adjustment of the laser power setting or other appropriate design specific increment. In any event, the increment applied should be small enough such that the resulting reflectivity range associated with the increment itself is less than the operating range $R_{OP}$.

Alternatively, assuming that the laser power calibration system 159e has proceeded to box 439, then the laser power setting of the laser 140 is decreased by a predefined increment. Regardless of whether the laser power setting is increased or decreased by the predefined increment as set forth in box 433 or 439, the laser power calibration system 159e then reverts back to box 413 to write an additional stitch pattern on the optical disc 136. In this respect, the laser power calibration system 159e repeatedly adjusts the laser power setting and rewrites stitch patterns on the optical disc 136 until the reflectivity difference between the marked and unmarked segments of the respective stitch patterns results in a percent reflectivity change that falls within the operating range $R_{OP}$ as described above.

In some embodiments, the same track 169 on an optical disc 136 may accommodate multiple stitch patterns, given that the laser power calibration system 159e may write multiple stitch patterns to the optical disc 136 as described above. In this respect, the stitch patterns may be interleaved with respect to each other. Also, the same unmarked segments may be employed for multiple different stitch patterns. Specifically, the marked segment of each pair that includes an unmarked segment common to multiple stitch patterns is written relatively close to the unmarked segment so as to ensure as little process variation in the coating on the label surface as is possible between the marked and unmarked segment of a respective pair. In this respect, a single track 169 may accommodate the writing of many different stitch patterns in the attempt to calibrate the power of the laser 140. As a result, the use of multiple tracks 169 for purposes of writing the calibration patterns may be avoided, thereby eliminating any potential negative effect on the appearance of the label to be printed to the optical disc 136. In an additional alternative, the stitch patterns may be written to segments that coincide with the pixels that comprise part of the label to be written to the label surface of the optical disc 136.

Assuming that the laser power calibration system 159e has proceeded to box 443, then the new power setting is stored for operation of the laser 140 in writing the label to the label surface of the optical disc 136. In this respect, the laser power setting is the last laser power setting employed to write a stitch pattern to the optical disc 136 as described above. Thereafter, the laser power calibration system 159e ends as shown.

Figure 11:
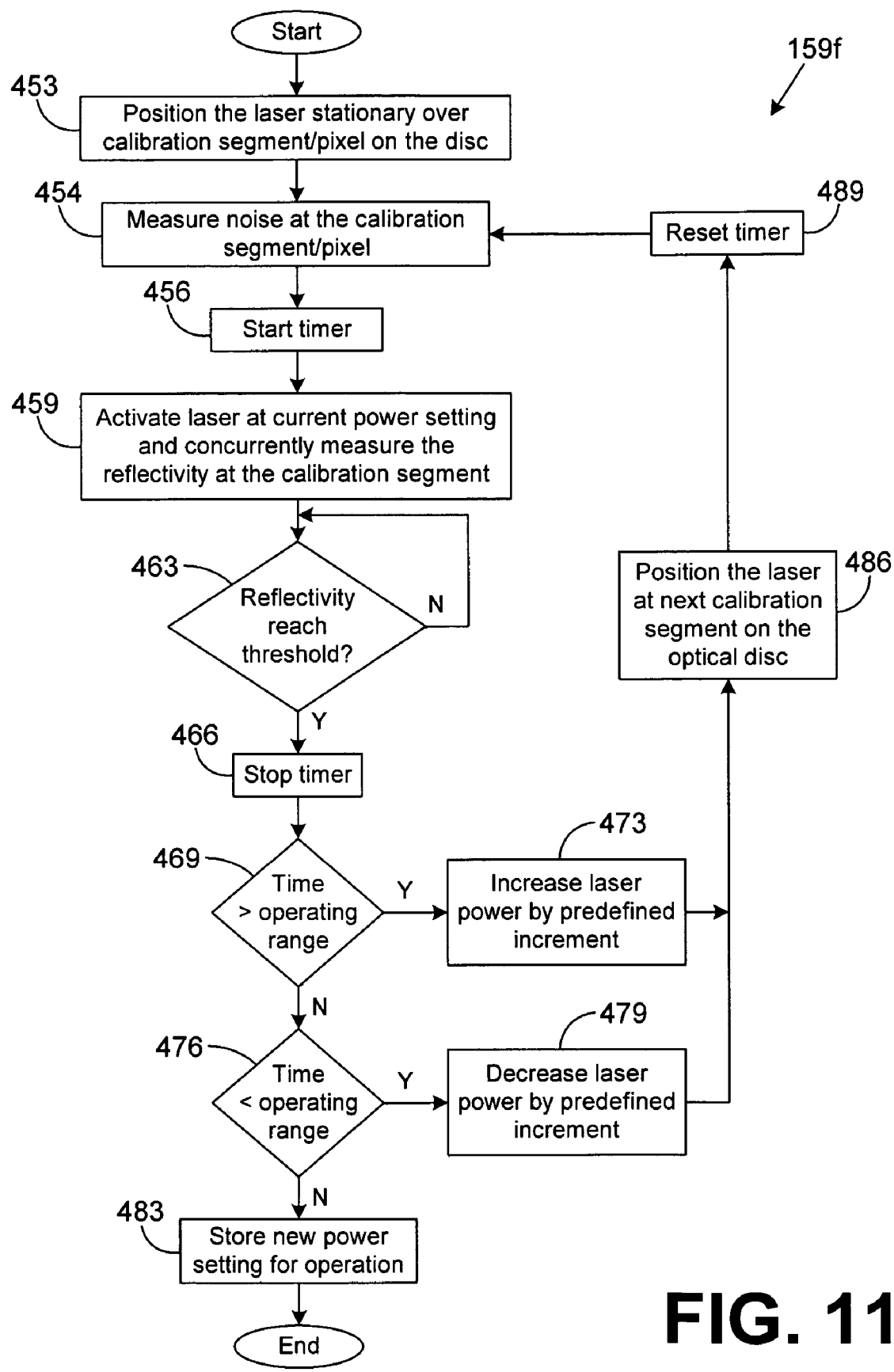
FIG. 11 is a flow chart of an additional embodiment of a laser power calibration system employed in the optical disc drive of FIG. 1 according to an embodiment of the present invention.

Referring next to FIG. 11, shown is a flow chart that provides one example of the operation of the laser power calibration system 159, denoted herein as laser power calibration system 159f, according to an embodiment of the present invention. Alternatively, the flow chart of FIG. 11 may be viewed as depicting steps of an example of a method implemented in the optical disc drive 100 (FIG. 1) to calibrate the power of the laser 140 (FIG. 1) for use in writing a label to the label surface of the optical disc 136 (FIG. 1).

Beginning with box 453, the laser power calibration system 159f positions the laser 140 over a calibration segment on the optical disc 136, where the segment may be, for example, a single pixel. In this regard, the laser 140 is held stationary relative to the optical disc 136 over the calibration segment. Next, in box 454, a measurement of the noise associated with the measuring of the reflectivity is obtained. This is done by taking a measurement of the reflectivity with the laser 140 (FIG. 1) turned off. In this respect, the signal from the sensor 141 (FIG. 1) is generated by noise from either a reflectivity of the optical disc 136 and due to electrical noise associated with the operation of the sensor 141 and other electrical components. Thereafter, in box 456, the laser power calibration system 159f starts a timer. In this respect, the timer may be a software component stored within the memory 116 (FIG. 1) as a portion of the laser power calibration system 159f. Alternatively, a hardware timer may be employed.

Next, in box 459, a laser 140 is activated at the current power setting. This may be, for example, the power setting employed to write a previous label to the label surface of a prior optical disc 136. Alternatively, some other laser power setting may be employed. Concurrent with the activation of the laser 140, the laser power calibration system 159f measures a reflectivity of the calibration segment. In this respect, the measuring of the reflectivity of the calibration segment is implemented concurrent with the application of the laser beam generated by the laser 140 to the calibration segment. When the laser 140 is initially activated, a highest reading of the reflectivity is obtained and stored. From this reading, the noise measured in box 454 is subtracted from this highest reading. Next, in box 463, the laser power calibration system determines whether the reflectivity of the calibration segment has fallen below a predefined reflectivity threshold stored in the memory 116.

This predefined reflectivity threshold may be, for example, a predefined percentage, for example, 10% of a reflectivity range extending from the noise measured in box 454 on the low side to the highest reflectivity obtained when the laser 140 was initially turned on in box 459. Alternatively, the predefined reflectivity threshold may be, for example, an approximation of the lowest possible reflectivity within the range of reliable reflectivity 189 (FIG. 3) or other value stored in the memory 116 of the optical disc drive 100. However, such a value is subject to inaccuracy due to the change in noise and degradation in the power of the laser 140 over time. In any event, once the reflectivity falls below the predefined reflectivity threshold in box 463, then in box 466 the laser power calibration system 159f stops the timer that was started in box 456 above. In this respect, the laser power calibration system 159f tracks a time for the reflectivity of the calibration segment to drop below the predefined reflectivity threshold of box 463 during the application of the laser beam to the calibration segment.

Next, in box 469, the laser power calibration system 159f determines whether the total time it took for the reflectivity to drop below the predefined reflectivity threshold is less than a lower limit of an operating range of time that is stored in the memory 116. In this respect, the operating range of time provides a window of time within which the reflectivity should drop below the reflectivity threshold in box 463. The operating range of time may be determined by experimentation. If the time it takes for the reflectivity to drop below the reflectivity threshold is less than the lower limit of the operating range of time, then the laser power setting should be decreased so that it takes a greater amount of time for the reflectivity of the text segment to drop below the reflectivity threshold in box 463.

On the other hand, if the time of operation is greater than an upper limit of the operating range of time, then the laser power should be increased so as to ensure that the reflectivity drops below the reflectivity threshold in box 463 within the operating range of time. Thus, in box 469, it is determined whether the time it took for the reflectivity to drop below the reflectivity threshold in box 463 is greater than the operating range of time. If such is the case then the laser power calibration system 159f proceeds to box 473. Otherwise, the laser power calibration system 159f proceeds to box 476.

Assuming that the laser power calibration system 159f has proceeded to box 476, then it is determined whether the time it took for the reflectivity to drop below the reflectivity threshold in box 463 is less than the operating range of time. If such is the case then the laser power calibration system 159f proceeds to box 479. Otherwise the laser power calibration system 159f proceeds to box 483.

Assuming that the laser power calibration system 159f has proceeded to either box 473 or box 479, then the time it took for the reflectivity to drop below the reflectivity threshold in box 453 is either less than or greater than the operating range of time. Thus, in box 473, the laser power is increased by a predefined increment. Conversely, in box 479 the laser power setting of the laser 140 is decreased by a predefined increment. In this respect, the increment by which the laser power setting is increased or decreased is design specific. For example, an increase or decrease of 10% of the total range of laser power settings may be applied. From either box 473 or box 479, the laser power calibration system 159f proceeds to box 486 in which the laser 140 is positioned over a subsequent calibration segment on the optical disc 136.

Thereafter, the laser power calibration system 159f moves to box 489 in which the timer is reset for operation. Next, the laser power calibration system 159f reverts back to box 454 in which the calibration cycle is performed a subsequent time in order to determine whether the alteration of the laser power in either box 473 or 479 causes the ultimate time it takes for the reflectivity to drop below the threshold in box 463 to fall within the operating range of time as described.

Assuming that the laser power calibration system 159f has proceeded to box 483, then the time it took for the reflectivity to drop below the reflectivity threshold in box 463 fell within the operating range of time. As such, the new power setting obtained is stored in the memory 116 and applied to the laser 140 for normal operation in writing labels to the label surface of the optical disc. Thereafter, the laser power calibration system 159ƒ ends as shown.

Although the various embodiments of the laser power calibration system 159 are depicted as being embodied in software or code executed by general purpose hardware as discussed above, as an alternative each of the various embodiments of the laser power calibration system 159 may also be embodied in dedicated hardware or a combination of software/general purpose hardware and dedicated hardware. If embodied in dedicated hardware, each one of the various embodiments of the laser power calibration system 159 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 4-6, 8, 10, and 11 show the architecture, functionality, and operation of an implementation of the various embodiments of the laser power calibration system 159. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow charts of FIGS. 4-6, 8, 10, and 11 show a specific order of execution, it is understood that the order of execution may differ from that which is depicted. For example, the order of execution of two or more blocks may be scrambled relative to the order shown. Also, two or more blocks shown in succession in FIGS. 4-6, 8, 10, and 11 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the various embodiments of the laser power calibration system 159 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the various embodiments of the laser power calibration system 159 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for calibrating a laser power in an optical disc drive, comprising the steps of:
    establishing a range of reflectivity of an optical disc in the optical disc drive;
    writing a calibration pattern of marked segments to the optical disc;
    measuring the reflectivity of the marked segments;
    generating an average reflectivity for each one of a plurality of laser power settings within the range of reflectivity, thereby obtaining a curve that depicts the average reflectivity with respect to the laser power settings;
    identifying the laser power setting at a knee of the curve;
    determining a slope of the curve at a position on the curve where the average reflectivity decreases as the laser power settings increase; and
    calculating the laser power setting that results in a predefined darkness based upon the laser power setting at the knee and based upon the slope.

2. The method of claim 1, further comprising the steps of:
    identifying the laser power setting at an ankle of the curve; and
    wherein the step of determining the slope of the curve further comprises determining the slope of the curve between the knee and the ankle.

3. The method of claim 1, wherein the step of writing the calibration pattern of marked segments to the optical disc further comprises writing an array of marked segments to the optical disc, wherein the array of marked segments includes marked segments written by the laser at multiple laser power settings.

4. The method of claim 1, further comprising:
    rewriting the calibration pattern of marked segments to the optical disc; and
    re-measuring the reflectivity of the marked segments.

5. The method of claim 1, wherein the step of writing the calibration pattern of marked segments to the optical disc further comprises writing the calibration pattern of marked segments over a plurality of marked segments of an image to be written to the label surface of the optical disc.

6. A computer-readable medium embodying a program for calibrating a laser power in an optical disc drive, comprising:
    code that establishes a range of reflectivity of an optical disc in the optical disc drive;
    code that implements a writing of a calibration pattern of marked segments to the optical disc;
    code that implements a measuring of the reflectivity of the marked segments;

code that generates an average reflectivity for each one of a plurality of laser power settings within the range of reflectivity, thereby obtaining a curve that depicts the average reflectivity with respect to the laser power settings;

code that identifies the laser power setting at a knee of the curve;

code that determines a slope of the curve at a position on the curve where the average reflectivity decreases as the laser power settings increase; and code that calculates the laser power setting that results in a predefined darkness based upon the laser power setting at the knee and based upon the slope.

7. The computer-readable medium of claim 6, further comprising:

code that identifies the laser power setting at an ankle of the curve; and wherein the code that determines the slope of the curve further comprises code that determines the slope of the curve between the knee and the ankle.

8. The computer readable medium of claim 6, wherein the calibration pattern of marked segments further comprises an array of marked segments on the optical disc, wherein the array of marked segments includes marked segments written by the laser at multiple laser power settings.

9. The computer readable medium of claim 6, further comprising:

code that implements a rewriting of the calibration pattern of marked segments to the optical disc; and code that implements a re-measuring of the reflectivity of the marked segments.

10. The computer readable medium of claim 6, wherein the code that implements the writing of the calibration pattern of marked segments to the optical disc causes the calibration pattern of marked segments to be written over a plurality of marked pixels of an image to be written to the label surface of the optical disc.

11. A laser power calibration system for calibrating a laser power in an optical disc drive, comprising:

a processor circuit having a processor and a memory;

a laser operatively coupled to the processor circuit, the laser being adapted to write a label to a label surface of an optical disc placed in the optical disc drive;

a sensor operatively coupled to the processor circuit, the sensor being adapted to measure a reflectivity at designated segments on the optical disc;

a laser power calibration system stored in the memory and executable by the processor, the laser power calibration system comprising:

logic that establishes a range of reflectivity of the optical disc in the optical disc drive;

logic that implements a writing of a calibration pattern of marked segments to the optical disc;

logic that implements a measuring of the reflectivity of the marked segments;

logic that generates an average reflectivity for each one of a plurality of laser power settings within the range of reflectivity, thereby obtaining a curve that depicts the average reflectivity with respect to the laser power settings;

logic that identifies the laser power setting at a knee of the curve;

logic that determines a slope of the curve at a position on the curve where the average reflectivity decreases as the laser power settings increase; and logic that calculates the laser power setting that results in a predefined darkness based upon the laser power setting at the knee and based upon the slope.

12. The laser power calibration system of claim 11, further comprising:

logic that identifies the laser power setting at an ankle of the curve; and wherein the logic that determines the slope of the curve further comprises logic that determines the slope of the curve between the knee and the ankle.

13. The laser power calibration system of claim 11, wherein the calibration pattern of marked segments further comprises an array of marked segments on the optical disc, wherein the array of marked segments includes marked segments written by the laser at multiple laser power settings.

14. The laser power calibration system of claim 11, wherein the laser power calibration system further comprises:

logic that implements a rewriting of the calibration pattern of marked segments to the optical disc; and logic that implements a re-measuring of the reflectivity of the marked segments.

15. The laser power calibration system of claim 11, wherein the logic that implements the writing of the calibration pattern of marked segments to the optical disc causes the calibration pattern of marked segments to be written over a plurality of marked pixels of an image to be written to the label surface of the optical disc.

16. A laser power calibration system for calibrating a laser power in an optical disc drive, comprising:

means for manipulating a laser in the optical disc drive and obtaining a number of reflectivity readings from a sensor to establish a range of reflectivity of the optical disc in the optical disc drive;

means for implementing a writing of a calibration pattern of marked segments to the optical disc using the laser;

means for implementing a measuring of the reflectivity of the marked segments using a sensor;

means for generating an average reflectivity for each one of a plurality of laser power settings within the range of reflectivity, thereby obtaining a curve that depicts the average reflectivity with respect to the laser power settings;

means for identifying the laser power setting at a knee of the curve;

means for determining a slope of the curve at a position on the curve where the average reflectivity decreases as the laser power settings increase; and means for calculating the laser power setting that results in a predefined darkness based upon the laser power setting at the knee and based upon the slope.

17. A method for calibrating a laser power in an optical disc drive, comprising the steps of:

establishing a range of reflectivity of an optical disc in the optical disc drive;

writing a calibration pattern of marked segments to the optical disc;

measuring the reflectivity of the marked segments to obtain at least one reflectivity for each one of a plurality of laser power settings within the range of reflectivity, thereby obtaining a curve that depicts the reflectivity with respect to the laser power settings using the at least one reflectivity for each one of the laser power settings;

identifying the laser power setting at a knee of the curve;

determining a slope of the curve at a position on the curve where the average reflectivity decreases as the laser power settings increase; and calculating the laser power setting that results in a predefined darkness based upon the laser power setting at the knee and based upon the slope.

18. A computer-readable medium embodying a program for calibrating a laser power in an optical disc drive, comprising:
   code that establishes a range of reflectivity of an optical disc in the optical disc drive;
   code that implements a writing of a calibration pattern of marked segments to the optical disc;
   code that implements a measuring of the reflectivity of the marked segments to obtain at least one reflectivity for each one of a plurality of laser power settings within the range of reflectivity, thereby obtaining a curve that depicts the reflectivity with respect to the laser power settings using the at least one reflectivity for each one of the laser power settings;
   code that identifies the laser power setting at a knee of the curve;
   code that determines a slope of the curve at a position on the curve where the average reflectivity decreases as the laser power settings increase; and
   code that calculates the laser power setting that results in a predefined darkness based upon the laser power setting at the knee and based upon the slope.

19. A laser power calibration system for calibrating a laser power in an optical disc drive, comprising:
   a processor circuit having a processor and a memory;
   a laser operatively coupled to the processor circuit, the laser being adapted to write a label to a label surface of an optical disc placed in the optical disc drive;
   a sensor operatively coupled to the processor circuit, the sensor being adapted to measure a reflectivity at designated segments on the optical disc;
   a laser power calibration system stored in the memory and executable by the processor, the laser power calibration system comprising:
      logic that establishes a range of reflectivity of the optical disc in the optical disc drive;
      logic that implements a writing of a calibration pattern of marked segments to the optical disc;
      logic that implements a measuring of the reflectivity of the marked segments to obtain at least one reflectivity for each one of a plurality of laser power settings within the range of reflectivity, thereby obtaining a curve that depicts the reflectivity with respect to the laser power settings using the at least one reflectivity for each one of the laser power settings;
      logic that identifies the laser power setting at a knee of the curve;
      logic that determines a slope of the curve at a position on the curve where the average reflectivity decreases as the laser power settings increase; and
      logic that calculates the laser power setting that results in a predefined darkness based upon the laser power setting at the knee and based upon the slope.

20. A laser power calibration system for calibrating a laser power in an optical disc drive, comprising:
   means for manipulating a laser in the optical disc drive and obtaining a number of reflectivity readings from a sensor to establish a range of reflectivity of the optical disc in the optical disc drive;
   means for implementing a writing of a calibration pattern of marked segments to the optical disc using the laser;
   means for implementing a measuring of a reflectivity of the marked segments to obtain a measured reflectivity for each one of a plurality of laser power settings within the range of reflectivity, thereby obtaining a curve that depicts the reflectivity with respect to the laser power settings using the measured reflectivity for each one of the laser power settings;
   means for identifying the laser power setting at a knee of the curve;
   means for determining a slope of the curve at a position on the curve where the average reflectivity decreases as the laser power settings increase; and
   means for calculating the laser power setting that results in a predefined darkness based upon the laser power setting at the knee and based upon the slope.

* * * * *